United States Patent
Yu et al.

(10) Patent No.: US 11,516,677 B2
(45) Date of Patent: *Nov. 29, 2022

(54) COMMUNICATION METHOD, APPARATUS, AND SYSTEM

(71) Applicant: Huawei Technologies Co., Ltd., Shenzhen (CN)

(72) Inventors: Fang Yu, Beijing (CN); Yan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 24 days.

This patent is subject to a terminal disclaimer.

(21) Appl. No.: 17/074,909

(22) Filed: Oct. 20, 2020

(65) Prior Publication Data

US 2021/0105629 A1 Apr. 8, 2021

Related U.S. Application Data

(63) Continuation of application No. 16/456,936, filed on Jun. 28, 2019, now Pat. No. 10,827,360, which is a (Continued)

(30) Foreign Application Priority Data

Apr. 9, 2018 (CN) .......... 201810313059.4
May 18, 2018 (CN) .......... 201810483383.0

(51) Int. Cl.
*H04W 16/10* (2009.01)
*H04W 60/00* (2009.01)
*H04W 48/12* (2009.01)

(52) U.S. Cl.
CPC .......... *H04W 16/10* (2013.01); *H04W 48/12* (2013.01); *H04W 60/00* (2013.01)

(58) Field of Classification Search
None
See application file for complete search history.

(56) References Cited

U.S. PATENT DOCUMENTS

2013/0195268 A1 8/2013 Norrman et al.
2017/0054595 A1 2/2017 Zhang et al.
(Continued)

FOREIGN PATENT DOCUMENTS

CN 106210042 A 12/2016
CN 106982458 A 7/2017
(Continued)

OTHER PUBLICATIONS

Huawei, et al., "Discussion for UE Configured NSSAI Update [online]," SA WG2 Meeting #127 S2-183344, Apr. 10, 2018, 5 pages.
(Continued)

*Primary Examiner* — Ajit Patel
(74) *Attorney, Agent, or Firm* — Conley Rose, P.C.

(57) ABSTRACT

A communication method, including: receiving, by an access and mobility management function network element in a first public land mobile network, a registration request message from a terminal device; and when determining that a first condition is met, sending configured network slice selection assistance information of the first public land mobile network to the terminal device. The first condition includes either of the following: the registration request message is an initial registration request message, or the registration request message is sent after the terminal device moves from a second public land mobile network to the first public land mobile network.

23 Claims, 12 Drawing Sheets

---

1101. An access and mobility management function network element in a first network obtains first configured network slice selection assistance information, associated with the first network, of a terminal device

↓

1102. The access and mobility management function network element sends the first configured network slice selection assistance information and indication information to the terminal device, where the indication information is used to instruct the terminal device to delete second configured network slice selection assistance information associated with another network different from the first network

Related U.S. Application Data continuation of application No. PCT/CN2019/072478, filed on Jan. 21, 2019.

(56) References Cited

U.S. PATENT DOCUMENTS

| | | |
|---|---|---|
| 2017/0303259 A1 | 10/2017 | Lee et al. |
| 2017/0339609 A1 | 11/2017 | Youn et al. |
| 2017/0367036 A1 | 12/2017 | Chen et al. |
| 2018/0014339 A1 | 1/2018 | Baek et al. |
| 2018/0192426 A1 | 7/2018 | Ryoo et al. |
| 2018/0227871 A1 | 8/2018 | Singh et al. |
| 2018/0279376 A1 | 9/2018 | Dinan et al. |
| 2018/0288582 A1 | 10/2018 | Buckley et al. |
| 2019/0007921 A1 | 1/2019 | Schliwa-Bertling et al. |
| 2019/0053308 A1 | 2/2019 | Castellanos Zamora et al. |
| 2019/0166016 A1 | 5/2019 | Livanos et al. |
| 2019/0166467 A1 * | 5/2019 | Livanos ............... H04W 48/00 |
| 2019/0174321 A1 | 6/2019 | Sun et al. |
| 2019/0223093 A1 | 7/2019 | Watfa et al. |
| 2019/0364541 A1 | 11/2019 | Ryu |
| 2019/0394651 A1 | 12/2019 | Wifvesson et al. |
| 2021/0029594 A1 * | 1/2021 | Kunz ................... H04W 36/14 |

FOREIGN PATENT DOCUMENTS

| | | | |
|---|---|---|---|
| CN | 107438245 A | 12/2017 | |
| CN | 107580360 A | 1/2018 | |
| CN | 109699072 B | 3/2020 | |
| RU | 2630175 C2 | 9/2017 | |
| WO | 2018008980 A1 | 1/2018 | |
| WO | 2018034924 A1 | 2/2018 | |
| WO | 2018064479 A1 | 4/2018 | |
| WO | WO-2018175498 A1 * | 9/2018 | ............ H04W 48/16 |
| WO | WO-2019145036 A1 * | 8/2019 | |

OTHER PUBLICATIONS

"3rd Generation Partnership Project; Technical Specification Group Services and System Aspects; System Architecture for the 5G System; Stage 2 (Release 15)," 3GPP TS 23.501, V15.1.0, Mar. 2018, 201 pages.

"3rd Generation Partnership Project; Technical Specification Group Services and System Aspects; Procedures for the 5G System; Stage 2 (Release 15)," 3GPP TS 23.502, V15.1.0, Mar. 2018, 285 pages.

Nokia, et al., "Exchange of S-NSSAI(s) during the registration," 3GPP TSG-CT WG1 Meeting #105, C1-172965, Krakow, Poland, Aug. 21-25, 2017, 8 pages.

LG Electronics, "Clarifications on UE configuration update procedure," 3GPP TSG-CT WG1 Meeting #109 C1-181374, Montreal, Canada, Feb. 26-Mar. 2, 2018, 4 pages.

Motorola Mobility, et al., "Slicing configuration update," S2-181163, 3GPP TSG-SA2 Meeting #125, Gothenburg, Sweden, Jan. 22-26, 2018, 8 pages.

Telecom Italia, et al., "Update of UE Network slicing configuration," 3GPP Draft; S2-182552, Feb. 28, 2018, XP051394173, 3 pages.

Zte, et al., "Clarifications of Subscribed and Configured S-NSSAI update," 3GPP Draft; S2-182983, Mar. 19, 2018, XP051412023, 3 pages.

3GPP TSG-SA2 Meeting #125,S2-180395, "Slicing configuration update," Jan. 22-26, 2018, Gothenburg, Sweden,total 6 pages.

SA WG2 Meeting #124,S2-179297, "TS 23.501: update of Configured NSSAI," Samsung, Oct. 27-Dec. 1, 2017, Reno, USA,total 5 pages.

3GPP TSG-SA2 Meeting #126,S2-182857, "Slicing configuration update," Motorola Mobility, Lenovo, ZTE, Ericsson, Samsung, InterDigital Inc, Feb. 26-Mar. 2, 2018, Montreal, Canada,total 8 pages.

* cited by examiner

1101. An access and mobility management function network element in a first network obtains first configured network slice selection assistance information, associated with the first network, of a terminal device

1102. The access and mobility management function network element sends the first configured network slice selection assistance information and indication information to the terminal device, where the indication information is used to instruct the terminal device to delete second configured network slice selection assistance information associated with another network different from the first network

FIG. 11

1201. A terminal device receives, from an access and mobility management function network element in a first network, first configured network slice selection assistance information, corresponding to the first network, of the terminal device 1202. The terminal device deletes second configured network slice selection assistance information associated with another network different from the first network, and replaces stored third configured network slice selection assistance information associated with the first network with the first configured network slice selection assistance information

FIG. 12

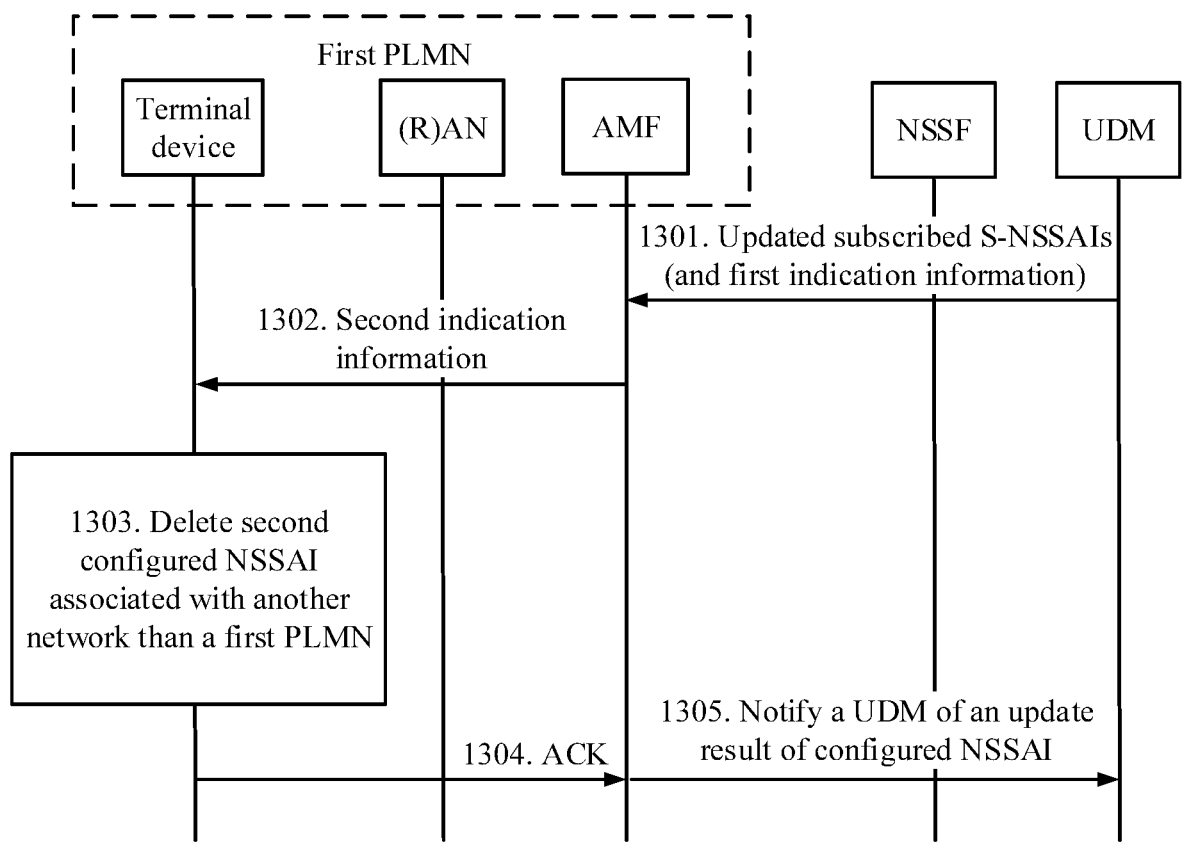

FIG. 13

COMMUNICATION METHOD, APPARATUS, AND SYSTEM

CROSS-REFERENCE TO RELATED APPLICATIONS

This application is a continuation of U.S. patent application Ser. No. 16/456,936, filed on Jun. 28, 2019, which is a continuation of International Patent Application No. PCT/CN2019/072478, filed on Jan. 21, 2019, which claims priority to Chinese Patent Application No. 201810313059.4, filed on Apr. 9, 2018 and Chinese Patent Application No. 201810483383.0, filed on May 18, 2018, all of which are hereby incorporated by reference in their entireties.

TECHNICAL FIELD

This application relates to the field of communications technologies, and more specifically, to a communication method, apparatus, and system.

BACKGROUND

With development of technologies, an increasing quantity of devices access a mobile network. Application scenarios of different devices may be different. Different types of application scenarios have different requirements on network functions and network performance. Converging and optimizing conventional single networks that are human-centered can no longer meet the requirements. In addition, optimization and requirements may vary greatly in different scenarios of network. For example, in some scenarios, an ultra-low latency and high-reliability service needs to be provided. In some other scenarios, a service with massive connections but a relatively small amount of data is required. In still other scenarios, a service with high bandwidth and a large amount of data is required. If a dedicated network is built for each scenario, network construction and operation costs of an operator are increased, causing a waste of resources. Therefore, a concept of network slicing emerges.

Network slicing may enable the operator to provide, on a same network infrastructure in an independent virtual logical network manner, different types of application scenarios with mutually isolated network environments, such that network functions and features may be customized in the different types of application scenarios depending on their respective requirements, and requirements of different services can be effectively ensured.

When a network slice is deployed on a core network, a terminal device stores a piece of configured network slice selection assistance information (NSSAI) for each public land mobile network (PLMN). When the terminal device registers with the network, a network slice selection process is triggered. For example, the terminal device generates Requested NSSAI based on configured network slice selection assistance information of a PLMN with which the terminal device requests to register or has registered, and sends the requested network slice selection assistance information to a network device. The network device feeds back Allowed NSSAI to the terminal device. A radio access network (RAN) device accessed by the terminal device may perform the selecting a network slice procedure using the allowed network slice selection assistance information.

The configured network slice selection assistance information of the PLMN may be updated, or the configured network slice selection assistance information stored by the terminal device is different from configured network slice selection assistance information of a public land mobile network in which the terminal device is located. However, in some scenarios, the network device may fail to send updated configured network slice selection assistance information to the terminal device. In this case, a network slice corresponding to the requested network slice selection assistance information determined by the terminal device may be inconsistent with a network slice that can be provided by the network device. Consequently, the terminal device may not request a network slice that is originally available, reducing user experience; or the terminal device may request to use an unavailable network slice, wasting signaling interaction. Therefore, how to ensure that the network device can send the updated configured network slice selection assistance information to the terminal device is a problem to be settled urgently.

SUMMARY

This application provides a communication method, apparatus, and system.

According to a first aspect, this application provides a communication method, including: receiving, by an access and mobility management function network element in a first public land mobile network, a registration request message from a terminal device; and when determining that a first condition is met, sending configured network slice selection assistance information of the first public land mobile network to the terminal device. The first condition includes either of the following: the registration request message is an initial registration request message; or the registration request message is sent after the terminal device moves from a second public land mobile network to the first public land mobile network.

According to the method, for a scenario in which subscribed S-NSSAIs of a terminal device changes when the terminal device is in a deregistered state (RM-DEREGISTERED), or for a scenario in which subscribed S-NSSAI included in subscription information of a terminal device changes when the terminal device moves from a second PLMN to a first PLMN and camps on the second PLMN, the method may be used to ensure that configured NSSAI of the first PLMN used by the terminal device is updated in time, thereby improving user experience of the terminal device and saving network resources.

In a possible design, the first condition further includes: the access and mobility management function network element obtains subscription information of the terminal device from a unified data management network element. Therefore, the AMF may be prevented from repeatedly sending the configured network slice selection assistance information of the first PLMN to the terminal device when the terminal device repeatedly registers with the AMF in a short time, thereby further avoiding a waste of network signaling and saving network resources.

According to a second aspect, this application provides a communication method, including: receiving, by a unified data management network element from a first access and mobility management function network element in a first public land mobile network, a request for obtaining subscription information of a terminal device, where the first access and mobility management function network element is an access and mobility management function network element that serves the terminal device; sending, by the unified data management network element, the subscription information of the terminal device to the first access and mobility management function network element, where the subscription information of the terminal device includes at least subscribed network slice selection assistance information of the terminal device; and instructing, by the unified data management network element, the first access and mobility management function network element to update first configured network slice selection assistance information, where the first configured network slice selection assistance information is configured network slice selection assistance information of the with which the terminal device requests to register.

According to the method, for a scenario in which subscribed S-NSSAI of a terminal device changes when the terminal device is in a deregistered state (RM-DEREGISTERED), or for a scenario in which subscribed S-NSSAI included in subscription information of a terminal device changes when the terminal device moves from a second PLMN to a first PLMN and camps on the second PLMN, the method may be used to ensure that configured NSSAI of the first PLMN used by the terminal device is updated in time, thereby improving user experience of the terminal device and saving network resources.

In a possible design, instructing, by the unified data management network element, the first access and mobility management function network element to update first configured network slice selection assistance information includes: sending, by the unified data management network element, first indication information to the first access and mobility management function network element, where the first indication information is used to instruct the first access and mobility management function network element to update the first configured network slice selection assistance information; or sending, by the unified data management network element, a subscription modification notification message of the terminal device to the first access and mobility management function network element, where the subscription modification notification message of the terminal device includes the subscribed network slice selection assistance information of the terminal device.

In a possible design, the method further includes: sending, by the unified data management network element, a subscription request to the first access and mobility management function network element, where the subscription request is used to request the first access and mobility management function network element to send a notification message to the unified data management (UDM) network element after the update of the first configured network slice selection assistance information is completed; and receiving, by the unified data management network element, the notification message from the first access and mobility management function network element. Therefore, it can be ensured that an identifier of a PLMN maintained by the UDM network element is the same as an actual update result of configured network slice selection assistance information of the PLMN of the terminal device.

In a possible design, after the unified data management network element instructs the first access and mobility management function network element to update the first configured network slice selection assistance information, the unified data management network element determines that the update of the first configured network slice selection assistance information does not need to be initiated. Alternatively, after the unified data management network element receives the notification message from the first access and mobility management function network element, the unified data management network element determines that the update of the first configured network slice selection assistance information does not need to be initiated.

In a possible design, before instructing, by the unified data management network element, the first access and mobility management function network element to update first configured network slice selection assistance information, the method further includes: determining, by the unified data management network element, that configured network slice selection assistance information of one or more public land mobile networks of the terminal needs to be updated, where the one or more public land mobile networks include the first public land mobile network. For example, when determining that the subscription information of the terminal device changes, the unified data management network element determines that the configured network slice selection assistance information of the one or more public land mobile networks of the terminal needs to be updated.

According to a third aspect, this application provides a communication method, including: sending, by a first access and mobility management function network element in a first public land mobile network to a unified data management network element, a request for obtaining subscription information of a terminal device, where the first access and mobility management function network element is an access and mobility management function network element that serves the terminal device; receiving, by the first access and mobility management function network element, the subscription information of the terminal device from the unified data management network element, where the subscription information of the terminal device includes at least subscribed network slice selection assistance information of the terminal device; and initiating, by the first access and mobility management function network element, an update of first configured network slice selection assistance information according to an indication of the unified data management network element, where the first configured network slice selection assistance information is configured network slice selection assistance information of the with which the terminal device requests to register.

According to the method, for a scenario in which subscribed S-NSSAI of a terminal device changes when the terminal device is in a deregistered state (RM-DEREGISTERED), or for a scenario in which subscribed S-NSSAI included in subscription information of a terminal device changes when the terminal device moves from a second PLMN to a first PLMN and camps on the second PLMN, the method may be used to ensure that configured NSSAI of the first PLMN used by the terminal device is updated in time, thereby improving user experience of the terminal device and saving network resources.

In a possible design, initiating, by the first access and mobility management function network element, an update of first configured network slice selection assistance information according to an indication of the unified data management network element includes: when receiving first indication information from the unified data management network element, initiating, by the first access and mobility management function network element, the update of the first configured network slice selection assistance information based on the subscribed network slice selection assistance information; or when receiving a subscription modification notification message of the terminal device from the unified data management network element, initiating, by the first access and mobility management function network element, the update of the first configured network slice selection assistance information based on the subscribed network slice selection assistance information of the terminal device included in the subscription modification notification message of the terminal device.

In a possible design, the method includes: receiving, by the first access and mobility management function network element, a subscription request from the unified data management network element, where the subscription request is used to request the first access and mobility management function network element to send a notification message to the unified data management network element after the update of the first configured network slice selection assistance information is completed; and after receiving a configuration update complete message from the terminal device, sending, by the first access and mobility management function network element, the notification message to the unified data management network element, where the configuration update complete message is used to indicate that the terminal device has completed the update of the first configured network slice selection assistance information. Therefore, it can be ensured that an identifier of a PLMN maintained by the UDM is the same as an actual update result of configured network slice selection assistance information of the PLMN of the terminal device.

According to a fourth aspect, this application provides a communication method, including: obtaining, by an access and mobility management function network element, subscribed network slice selection assistance information of a terminal device; obtaining first configured network slice selection assistance information of the terminal device, where the first configured network slice selection assistance information is configured network slice selection assistance information of a first public land mobile network with which the terminal device requests to register; determining, based on the subscribed network slice selection assistance information, whether the first configured network slice selection assistance information needs to be updated; and if the access and mobility management function network element determines that the first configured network slice selection assistance information needs to be updated, determining second configured network slice selection assistance information based on the subscribed network slice selection assistance information, and sending the second configured network slice selection assistance information to the terminal device.

In a possible design, obtaining, by the access and mobility management function network element, first configured network slice selection assistance information of the terminal device includes: receiving, by the access and mobility management function network element, a registration request message from the terminal device, where the registration request message includes the first configured network slice selection assistance information. For example, the registration request message is an initial registration request message, or the registration request message is sent after the terminal device moves from a second public land mobile network to the first public land mobile network. Alternatively, the access and mobility management function network element obtains a context of the terminal device, where the context of the terminal device includes the first configured network slice selection assistance information.

In a possible design, determining, by the access and mobility management function network element based on the subscribed network slice selection assistance information, whether the first configured network slice selection assistance information needs to be updated includes: determining, by the access and mobility management function network element, whether the first configured network slice selection assistance information is the same as the subscribed network slice selection assistance information, and if the first configured network slice selection assistance information is different from the subscribed network slice selection assistance information, determining that the first configured network slice selection assistance information needs to be updated to the second configured network slice selection assistance information, where single network slice selection assistance information included in the second configured network slice selection assistance information is the same as the subscribed network slice selection assistance information.

In a possible design, the first configured network slice selection assistance information is configured network slice selection assistance information of a visited public land network of the terminal device, and determining, by the access and mobility management function network element based on the subscribed network slice selection assistance information, whether the first configured network slice selection assistance information needs to be updated includes: determining, by the access and mobility management function network element based on the first configured network slice selection assistance information, the subscribed network slice selection assistance information, and a mapping relationship between the first configured network slice selection assistance information and configured network slice selection assistance information of a home public land network of the terminal device, whether the first configured network slice selection assistance information needs to be updated.

In a possible design, the method further includes: storing, by the access and mobility management function network element, the second configured network slice selection assistance information in the context of the terminal device. In this way, when the terminal device registers with another AMF, the other AMF may directly obtain the second configured network slice selection assistance information from the context of the terminal device.

According to a fifth aspect, this application provides a communication method, including: sending, by a terminal device, a registration request message to an access and mobility management function network element, where the registration request message includes first configured network slice selection assistance information of the terminal device, and the first configured network slice selection assistance information is configured network slice selection assistance information of a first public land mobile network with which the terminal device requests to register; and obtaining second configured network slice selection assistance information of the first public land mobile network.

According to the method, for a scenario in which subscribed S-NSSAI of a terminal device changes when the terminal device is in a deregistered state (RM-DEREGISTERED), or for a scenario in which subscribed S-NSSAI included in subscription information of a terminal device changes when the terminal device moves from a second PLMN to a first PLMN and camps on the second PLMN, the method may be used to ensure that configured NSSAI of the first PLMN used by the terminal device is updated in time, thereby improving user experience of the terminal device and saving network resources.

In a possible design, the registration request message is an initial registration request message, or the registration request message is sent after the terminal device moves from a second public land mobile network to the first public land mobile network.

According to a sixth aspect, this application provides a communication method, including: receiving, by a terminal device, an updated user equipment route selection policy; determining that no transmission of update indication information to an access and mobility management function network element is recorded; sending the update indication information to the access and mobility management function network element, where the update indication information is used to instruct the access and mobility management function network element to send updated configured network slice selection assistance information to the terminal device, and the access and mobility management function network element is located in a visited public land mobile network; and recording that the update indication information has been sent to the visited PLMN.

According to the method, for a scenario in which subscribed S-NSSAI of a terminal device changes when the terminal device is in a deregistered state (RM-DEREGISTERED), or for a scenario in which subscribed S-NSSAI included in subscription information of a terminal device changes when the terminal device moves from a second PLMN to a first PLMN and camps on the second PLMN, the method may be used to ensure that configured NSSAI of the first PLMN used by the terminal device is updated in time, thereby improving user experience of the terminal device and saving network resources.

According to a seventh aspect, an embodiment of this application further provides a communication method, including: obtaining, by an access and mobility management function network element in a first network, first configured network slice selection assistance information, associated with the first network, of a terminal device; and sending the first configured network slice selection assistance information and indication information to the terminal device, where the indication information is used to instruct the terminal device to delete second configured network slice selection assistance information associated with another network than the first network.

Therefore, when the terminal device registers with the other network next time, because the terminal device does not store configured network slice selection assistance information corresponding to the network, the terminal device does not add requested network slice selection assistance information to a registration request. Therefore, a network side provides the terminal device with a piece of configured network slice selection assistance information of the network based on current subscription information of the terminal device. Therefore, the configured network slice selection assistance information of the network can be updated in time, thereby improving user experience of the terminal device and saving network resources.

In a possible design, the indication information is further used to instruct the terminal device to delete allowed network slice selection assistance information associated with the other network. Therefore, when the terminal device registers with the other network next time, because the terminal device does not store the allowed network slice selection assistance information corresponding to the network either, and the terminal device cannot determine the requested network slice selection assistance information based on the allowed network slice selection assistance information, the terminal device does not add the requested network slice selection assistance information to the registration request. Therefore, the network side provides the terminal device with a piece of configured network slice selection assistance information of the network based on the current subscription information of the terminal device. Therefore, it is further ensured that the configured network slice selection assistance information of the network can be updated in time.

In a possible design, obtaining, by an access and mobility management function network element in a first network, first configured network slice selection assistance information, associated with the first network, of a terminal device includes: receiving, by the access and mobility management function network element from a data management network element, updated subscribed network slice selection assistance information, associated with the first network, of the terminal device; and obtaining the first configured network slice selection assistance information based on the updated subscribed network slice selection assistance information. If the access and mobility management function network element determines that the first configured network slice selection assistance information is obtained based on the updated subscribed network slice selection assistance information, the access and mobility management function network element sends the indication information to the terminal device. In other words, the method is applicable to a scenario in which subscription data modification of the terminal device results in a change of configured NSSAI of the terminal device in a current PLMN.

In a possible design, sending, by the access and mobility management function network element, the first configured network slice selection assistance information and indication information to the terminal device includes: sending, by the access and mobility management function network element, a user equipment configuration update command to the terminal device, where the user equipment configuration update command includes the first configured network slice selection assistance information and the indication information; or sending, by the access and mobility management function network element, a registration accept message to the terminal device, where the registration accept message includes the first configured network slice selection assistance information and the indication information.

According to an eighth aspect, an embodiment of this application further provides a communication method, including: receiving, by a terminal device from an access and mobility management function network element in a first network, first configured network slice selection assistance information, corresponding to the first network, of the terminal device; deleting second configured network slice selection assistance information associated with another network than the first network; and replacing stored third configured network slice selection assistance information associated with the first network with the first configured network slice selection assistance information.

Therefore, because the terminal device deletes the second configured network slice selection assistance information associated with the other network than the first network, when the terminal device registers with the other network next time, because the terminal device does not store configured network slice selection assistance information corresponding to the network, the terminal device does not add requested network slice selection assistance information to a registration request. Therefore, a network side provides the terminal device with a piece of configured network slice selection assistance information of the network based on current subscription information of the terminal device. Therefore, the configured network slice selection assistance information of the network can be updated in time, thereby improving user experience of the terminal device and saving network resources.

In a possible design, the method further includes: receiving, by the terminal device, indication information from the access and mobility management function network element, where the indication information is used to instruct the terminal device to delete the second configured network slice selection assistance information.

In a possible design, the method further includes: deleting, by the terminal device, allowed network slice selection assistance information associated with the other network. For example, the terminal device receives the indication information from the access and mobility management function network element, where the indication information is used to instruct the terminal device to delete the second configured network slice selection assistance information and the allowed network slice selection assistance information. Therefore, when the terminal device registers with the other network next time, because the terminal device does not store the allowed network slice selection assistance information corresponding to the network either, and the terminal device cannot determine the requested network slice selection assistance information based on the allowed network slice selection assistance information, the terminal device does not add the requested network slice selection assistance information to the registration request. Therefore, the network side provides the terminal device with a piece of configured network slice selection assistance information of the network based on the current subscription information of the terminal device. Therefore, it is further ensured that the configured network slice selection assistance information of the network can be updated in time.

According to a ninth aspect, an embodiment of this application further provides a communications apparatus, where the communications apparatus includes units configured to implement any one of the first aspect or possible implementations of the first aspect, or includes units configured to implement any one of the second aspect or possible implementations of the second aspect, or includes units configured to implement any one of the third aspect or possible implementations of the third aspect, or includes units configured to implement any one of the fourth aspect or possible implementations of the fourth aspect, or includes units configured to implement any one of the fifth aspect or possible implementations of the fifth aspect, or includes units configured to implement any one of the sixth aspect or possible implementations of the sixth aspect, or includes units configured to implement any one of the seventh aspect or possible implementations of the seventh aspect, or includes units configured to implement any one of the eighth aspect or possible implementations of the eighth aspect.

According to a tenth aspect, an embodiment of this application provides a communications apparatus, where the communications apparatus includes: a memory configured to store a program; and a processor configured to execute the program stored in the memory. When the program is executed, the processor is configured to perform the method according to any one of the first aspect or possible implementations of the first aspect, or is configured to perform the method according to any one of the second aspect or possible implementations of the second aspect, or is configured to perform the method according to any one of the third aspect or possible implementations of the third aspect, or is configured to perform the method according to any one of the fourth aspect or possible implementations of the fourth aspect, or is configured to perform the method according to any one of the fifth aspect or possible implementations of the fifth aspect, or is configured to perform the method according to any one of the sixth aspect or possible implementations of the sixth aspect, or is configured to perform the method according to any one of the seventh aspect or possible implementations of the seventh aspect, or is configured to perform the method according to any one of the eighth aspect or possible implementations of the eighth aspect. Optionally, the communications apparatus is a chip or an integrated circuit.

According to an eleventh aspect, an embodiment of this application provides a computer readable storage medium. The computer readable storage medium stores an instruction. When the instruction runs on a computer, the computer is enabled to perform the methods according to the foregoing aspects.

According to a twelfth aspect, an embodiment of this application provides a computer program product including an instruction. When the computer program product runs on a computer, the computer is enabled to perform the methods according to the foregoing aspects.

BRIEF DESCRIPTION OF DRAWINGS

FIG. 11 is a schematic flowchart of still another communication method according to an embodiment of this application;

FIG. 12 is a schematic flowchart of still another communication method according to an embodiment of this application; and FIG. 13 is a schematic flowchart of still another communication method according to an embodiment of this application.

DESCRIPTION OF EMBODIMENTS

Figure 1:
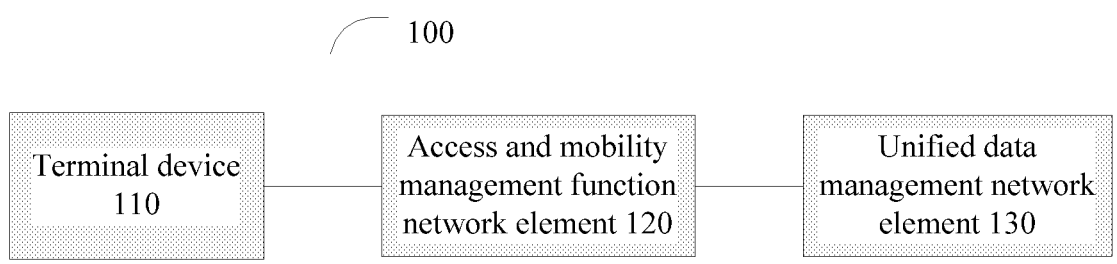
FIG. 1 is a structural block diagram of a system.

The following describes the technical solutions of this application with reference to the accompanying drawings.

The technical solutions of the embodiments of this application may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WWiMAX) communications system, a future 5th generation (5G) system, or a new radio (NR) system.

A terminal device in the embodiments of this application may also be referred to as a user equipment (UE), an access terminal, a subscriber unit, a subscriber station, a mobile station, a remote station, a remote terminal, a mobile device, a user terminal, a terminal, a wireless communications device, a user agent, a user apparatus, or the like. The terminal device may alternatively be a cellular phone, a cordless phone, a Session Initiation Protocol (SIP) phone, a wireless local loop (WLL) station, a personal digital assistant (PDA), a handheld device having a wireless communications function, a computing device, another processing device connected to a wireless modem, an in-vehicle device, a wearable device, a terminal device in a future 5G network, a terminal device in a future evolved public land mobile network (PLMN), or the like. This is not limited in the embodiments of this application.

When a network slice is deployed on a core network, if a user initially attaches to a network, a network slice selection process is triggered. The network slice selection process depends on subscription data of the user, local configuration information, a roaming protocol, an operator policy, and the like. In the network slice selection process, an optimal network slice type can be selected for a terminal device only by considering all the foregoing parameters. To select the optimal network slice type for the terminal device, the 3rd Generation Partnership Project (3GPP) has defined several different types of network slice selection assistance information (NSSAI).

When the terminal device needs to access a specific network slice, the terminal device may provide the core network with requested NSSAI, which is used by the core network to select a network slice instance for the terminal device. For example, the terminal device may provide a network with NSSAI including a set of parameters, to select a network slice instance for the terminal device. The NSSAI may be a standardized value or a specific value in a PLMN. The NSSAI may be a set of single network slice selection assistance information (S-NSSAI), and each piece of S-NSSAI is used to identify a network slice type. The terminal device may store configured NSSAI and/or allowed NSSAI of each PLMN. The configured NSSAI is configured in the terminal device before interaction between the terminal device and the PLMN. The configured NSSAI is used to construct requested NSSAI that needs to be used by the terminal device when the terminal device initially accesses the PLMN. A network side determines a suitable network slice type and a suitable serving access and mobility management function (AMF) for the terminal device based on the requested NSSAI. In the embodiments of this application, subscribed network slice selection assistance information of the terminal device is referred to as subscribed S-NSSAIs of the terminal device, and includes one or more pieces of subscribed single network slice selection assistance information (subscribed S-NSSAIs). When the subscribed S-NSSAIs of the terminal device change, an update of configured NSSAI of each PLMN of the terminal device may be triggered.

To better understand the technical solutions of this application, a system to which this application is applied is described first.

FIG. 1 is a structural block diagram of a system. The system 100 shown in FIG. 1 includes a terminal device 110, an access and mobility management function (AMF) network element 120, and a unified data management (UDM) network element 130.

The access and mobility management function network element 120 is responsible for mobility management of the terminal device. For example, the mobility management function network element 120 may manage a moving status of a user, and allocate a temporary user identifier. In addition, the mobility management function network element 120 may authenticate and authorize the user.

The unified data management network element 130 is responsible for managing subscription data of the terminal device. When the subscription data is modified, the unified data management network element 130 is responsible for notifying a corresponding network element.

An access and mobility management function and unified data management may be implemented by specified hardware, or may be implemented by a software instance on specified hardware, or may be implemented using a virtual function instantiated on a suitable platform. This is not limited in this application.

For convenience of description, in the following embodiments, AMF is short for access and mobility management function network element, and UDM is short for unified data management network element.

In the structural block diagram of the system shown in FIG. 1, only network elements in the system that are related to the technical solutions of this application are shown. A person skilled in the art may understand that, the system 100 shown in FIG. 1 may further include other network elements for implementing wireless communication, for example, a radio access network (RAN) device and a session management function (SMF) network element.

Figure 2:
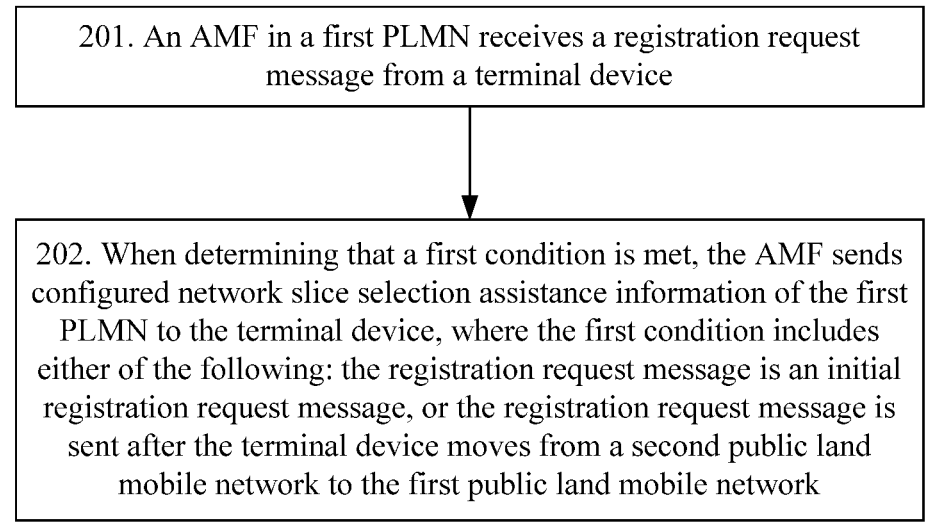
FIG. 2 is a schematic flowchart of a communication method according to an embodiment of this application.

FIG. 2 is a schematic flowchart of a communication method according to an embodiment of this application.

201. An AMF in a first public land mobile network (PLMN) receives a registration request message from a terminal device.

The AMF is a serving AMF of the terminal device. For example, the AMF receives the registration request message of the terminal device forwarded by a RAN device.

202. When determining that a first condition is met, the AMF sends configured NSSAI of the first PLMN to the terminal device, where the first condition includes either of the following: the registration request message is an initial registration request message, or the registration request message is sent after the terminal device moves from a second PLMN to the first PLMN.

For example, when the terminal device is powered on or deregisters and then re-registers with a network, the terminal device sends the initial registration request message to the AMF, to request to register with the network. For example, the initial registration request message may be a registration request message whose registration type is initial registration.

The AMF may determine, based on a 5G Globally Unique Temporary Identifier (GUTI) carried in the registration request message sent by the terminal device, that the terminal device moves from the second PLMN to the first PLMN. The 5G GUTI includes a mobile country code (MCC) and a mobile network code (MNC). The MCC and the MNC form a PLMN Identifier (ID). The AMF may obtain the PLMN ID from the 5G GUTI. The PLMN ID is a PLMN ID of a PLMN in which a last AMF that serves the terminal device is located. In addition, when the terminal device moves from the second PLMN to the first PLMN, a registration type carried in the registration request message sent by the terminal device to the AMF is mobility registration update. Therefore, a condition for sending the configured network slice selection assistance information of the first PLMN to the terminal device may also be understood as follows: The registration type carried in the registration request message is mobility registration update.

In some cases, subscribed S-NSSAIs of the terminal device may change when the terminal device is in a deregistered state (RM-DEREGISTERED), and the change of the subscribed S-NSSAIs of the terminal device may result in a change of configured NSSAI of each PLMN of the terminal device. Because the terminal device is in the deregistered state, a 5G core network cannot send updated configured NSSAI of each PLMN to the terminal. Consequently, the configured NSSAI of each PLMN that is currently stored by the terminal cannot be updated in time (briefly referred to as scenario 1 below). If the method shown in FIG. 2 is used, provided that the registration type carried in the registration request message sent by the terminal device to the AMF in the first PLMN is initial registration, the AMF in the first PLMN sends the configured network slice selection assistance information of the first PLMN to the terminal device. In this way, it can be ensured that when scenario 1 occurs, after the terminal device registers with the first PLMN, the AMF may send the configured NSSAI of the first PLMN to the terminal device in time. Therefore, the terminal device may obtain updated configured NSSAI of the first PLMN in time. When subsequently accessing the first PLMN, the terminal device may determine requested NSSAI based on the updated configured NSSAI, and provide the core network with the requested NSSAI for network slice selection.

For example, at an initial moment, subscribed S-NSSAIs of the terminal device include S-NSSAI 1, S-NSSAI 2, and S-NSSAI 4. Because network slices corresponding to the S-NSSAI 1, the S-NSSAI 2, and S-NSSAI 3 are deployed on the first PLMN, configured NSSAIs of the terminal device in the first PLMN include the S-NSSAI 1 and the S-NSSAI 2. When the subscribed S-NSSAIs of the terminal device change, for example, changed subscribed S-NSSAIs include the S-NSSAI 1, the S-NSSAI 2, and the S-NSSAI 3, according to a conventional solution, the configured NSSAIs of the terminal device in the first PLMN cannot be updated in time. Therefore, a network slice corresponding to the S-NSSAI 3 cannot be used. However, according to the solutions of this embodiment of this application, the configured NSSAIs of the first PLMN used by the terminal device may be updated in time. For example, updated configured NSSAIs of the first PLMN include the S-NSSAI 1, the S-NSSAI 2, and the S-NSSAI 3. Therefore, the terminal device can use the network slice corresponding to the S-NSSAI 3, thereby improving user experience.

For another example, changed subscribed S-NSSAIs include the S-NSSAI 1 and the S-NSSAI 4. According to a conventional solution, the configured NSSAIs of the terminal device cannot be updated in time. Therefore, the terminal device may request to use a network slice corresponding to the S-NSSAI 2 in the first PLMN, and this causes a waste of network signaling. However, according to the solutions of this embodiment of this application, the configured NSSAIs of the first PLMN used by the terminal device may be updated in time. For example, updated configured NSSAIs of the first PLMN include the S-NSSAI 1. Therefore, the terminal device does not request to use the network slice corresponding to the S-NSSAI 2, thereby avoiding a waste of network signaling and saving network resources. In some cases, the terminal device moves from the second PLMN to the first PLMN. If subscribed S-NSSAIs included in subscription information of the terminal device change when the terminal device camps on the second PLMN, the change of the subscribed S-NSSAIs of the terminal device may cause a change of the configured NSSAI of each PLMN of the terminal device. However, because the terminal device camps on the second PLMN, the AMF sends only configured NSSAI of the second PLMN to the terminal device, but does not send the configured NSSAI of the first PLMN of the terminal device (briefly referred to as scenario 2). If the method shown in FIG. 2 is used, provided that the registration type of the terminal device is mobility registration update and the terminal device moves from the second PLMN to the first PLMN, the AMF can send updated configured NSSAI of the first PLMN to the terminal device. Similarly, the method shown in FIG. 2 may be used to ensure that the configured NSSAI of the first PLMN used by the terminal device is updated in time, thereby improving user experience of the terminal device and saving network resources.

Optionally, in some embodiments, the first condition further includes: the AMF obtains subscription information of the terminal device from a UDM. The UDM may be a UDM in a home PLMN (HPLMN) of the terminal device. The subscription information of the terminal device may include the subscribed S-NSSAIs of the terminal device. In other words, when the foregoing condition is met, the AMF sends the configured NSSAI of the first PLMN to the terminal device only after the AMF obtains the subscription information of the terminal device from the UDM. According to the foregoing technical solutions, the AMF may be prevented from repeatedly sending the configured network slice selection assistance information of the first PLMN to the terminal device when the terminal device repeatedly registers with the AMF in a short time, thereby further avoiding a waste of network signaling and saving network resources.

That the AMF sends configured NSSAI of the first PLMN to the terminal device, namely, step 202, may include: adding, by the AMF, the configured NSSAI of the first PLMN to a registration accept message, and sending the registration accept message to the terminal device; or sending, by the AMF, the configured NSSAI to the terminal device using a user equipment (UE) configuration update command.

Figure 3:
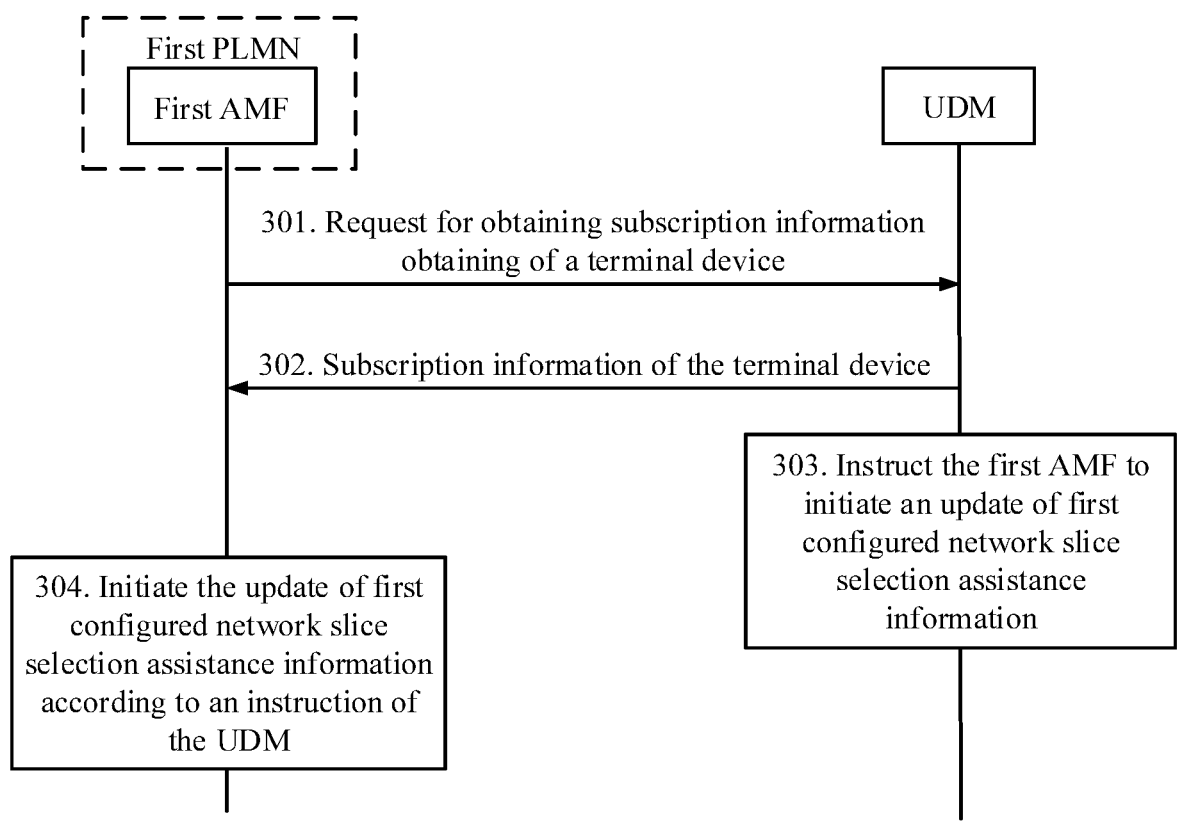
FIG. 3 is a schematic flowchart of another communication method according to an embodiment of this application.

FIG. 3 is a schematic flowchart of another communication method according to an embodiment of this application.

301. A UDM receives, from a first AMF in a first PLMN, a request for obtaining subscription information of a terminal device, where the first AMF is an AMF that serves the terminal device.

The UDM is a UDM in a home PLMN of the terminal device.

302. The UDM sends the subscription information of the terminal device to the first AMF, where the subscription information includes at least subscribed S-NSSAIs of the terminal device.

303. The UDM instructs the first AMF to update first configured network slice selection assistance information, where the first configured network slice selection assistance information is configured network slice selection assistance information of the first PLMN of the terminal device.

304. The first AMF initiates the update of the first configured network slice selection assistance information according to an indication of the UDM.

According to the method shown in FIG. 3, when sending the subscribed S-NSSAIs of the terminal device to an AMF that serves the terminal device, the UDM may instruct the AMF to update the first configured network slice selection assistance information. In this way, the AMF may update the configured network slice selection assistance information according to the indication of the UDM.

Optionally, in some embodiments, that the UDM instructs the first AMF to update first configured network slice selection assistance information includes: sending, by the UDM, first indication information to the first AMF, where the first indication information is used to instruct the first AMF to update the first configured network slice selection assistance information. In this case, when receiving the first indication information from the UDM, the first AMF initiates the update of the first configured network slice selection assistance information based on the subscribed S-NSSAIs of the terminal device included in the subscription information of the terminal device. In the foregoing technical solutions, the UDM instructs, in an explicit indication manner, the first AMF to update the first configured network slice selection assistance information. This will be further described with reference to FIG. 4. Optionally, the first indication information may be used to instruct, in an implicit manner, the first AMF to update the first configured network slice selection assistance information. For example, the first indication information is used to indicate that the subscribed S-NSSAIs of the terminal device are updated. In this case, when receiving the first indication information from the UDM, the first AMF determines, based on the subscribed S-NSSAIs of the terminal device included in the subscription information of the terminal device, to update the first configured network slice selection assistance information. This will be further described with reference to FIG. 10.

Optionally, in some other embodiments, that the UDM instructs the first AMF to update first configured network slice selection assistance information includes: sending, by the UDM, a subscription modification notification message of the terminal device to the first AMF, where the subscription modification notification message of the terminal device includes the subscribed S-NSSAIs of the terminal device. In this case, when receiving the subscription modification notification message of the terminal device from the UDM, the first AMF initiates the update of the first configured network slice selection assistance information based on the subscribed S-NSSAIs of the terminal device included in the subscription modification notification message of the terminal device. This will be further described with reference to FIG. 5.

Optionally, in some embodiments, the UDM may further send a subscription request to the first AMF, where the subscription request is used to request the first AMF to send a notification message to the UDM after the update of the first configured network slice selection assistance information is completed. After receiving the subscription request, and after receiving a configuration update complete message from the terminal device, the first AMF sends the notification message to the UDM, where the configuration update complete message is used to indicate that the terminal device has completed the update of the first configured network slice selection assistance information. Correspondingly, the UDM may receive the notification message from the first AMF. According to the foregoing technical solutions, the UDM may determine whether the update of the first configured network slice selection assistance information has been completed.

Optionally, in some embodiments, before the UDM instructs the first AMF to update the first configured network slice selection assistance information, the UDM may further determine that configured network slice selection assistance information of one or more PLMNs of the terminal device needs to be updated, where the one or more PLMNs include the first PLMN. The one or more PLMNs are PLMNs with which the terminal device can register. For example, when determining that the subscription information of the terminal device changes, the UDM may determine that the configured network slice selection assistance information of the one or more PLMNs of the terminal device needs to be updated.

Optionally, in some embodiments, the one or more PLMNs include a second PLMN. In this case, the UDM may record that the update of the first configured network slice selection assistance information needs to be initiated. The UDM may further record that an update of second configured network slice selection assistance information needs to be initiated, where the second configured network slice selection assistance information is configured network slice selection assistance information of a second public land mobile network of the terminal device.

Optionally, in some embodiments, after receiving, from the first AMF, the notification message that is used to indicate that the update of the first configured network slice selection assistance information has been completed, the UDM may record that the update of the first configured network slice selection assistance information does not need to be initiated. Alternatively, after the UDM instructs the first AMF to update the first configured network slice selection assistance information, the UDM may record that the update of the first configured network slice selection assistance information does not need to be initiated. Therefore, an update status of configured network slice selection assistance information of each PLMN can be accurately maintained, and network management can be optimized.

After step 304, if the UDM receives again, from the first AMF, the request for obtaining the subscription information of the terminal device, and the UDM determines that the configured network slice selection assistance information of the first PLMN of the terminal device does not need to be updated, the UDM does not change a record about whether to update the first configured network slice selection assistance information. In this case, the UDM may instruct the first AMF not to update the first configured network slice selection assistance information. The UDM may instruct, in an explicit indication manner, the first AMF not to update the first configured network slice selection assistance information. For example, the UDM may send second indication information to the first AMF, where the second indication information is used to instruct the first AMF not to update the first configured network slice selection assistance information. Alternatively, the UDM may instruct, in an implicit indication manner, the first AMF not to update the first configured network slice selection assistance information. For example, the UDM does not send, to the first AMF, information (for example, the first indication information or the subscription modification notification message of the terminal device) that is used to instruct the first AMF to update the first configured network slice selection assistance information.

Figure 4:
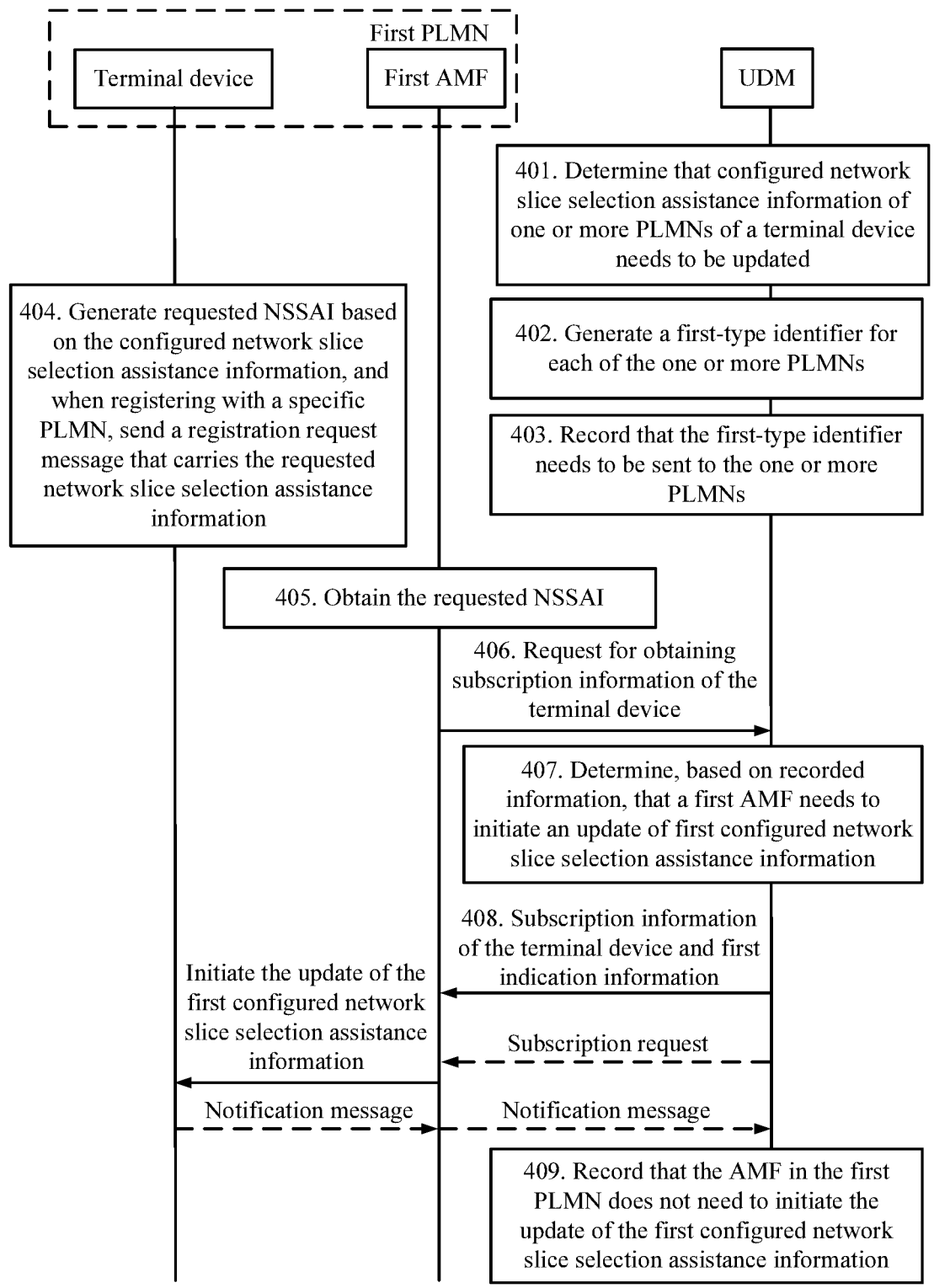
FIG. 4 is a schematic flowchart of another communication method according to an embodiment of this application.

FIG. 4 is a schematic flowchart of another communication method according to an embodiment of this application.

401. A UDM determines that configured network slice selection assistance information of one or more PLMNs of a terminal device needs to be updated.

The one or more PLMNs include a first PLMN. The UDM is a UDM in a home PLMN of the terminal device.

Optionally, the UDM may determine that subscribed S-NSSAIs of the terminal device change, and then further determine that the configured network slice selection assistance information of the one or more PLMNs of the terminal device needs to be updated.

402. The UDM generates a first-type identifier for each of the one or more PLMNs.

For example, the first-type identifier is used to indicate that an AMF in each of the one or more PLMN needs to update configured network slice selection assistance information of the PLMN. For convenience of description, the first-type identifier of each PLMN may be referred to as first indication information. The first indication information is used to instruct a first AMF in the first PLMN to update first configured network slice selection assistance information. The first configured network slice selection assistance information is configured network slice selection assistance information of the first PLMN of the terminal device. In other words, step 402 may such that the UDM generates first indication information, where the first indication information is used to instruct the first AMF to update the first configured network slice selection assistance information.

It is assumed that the one or more PLMNs further include a second PLMN, and an AMF in the second PLMN is a second AMF. A first-type identifier of the second PLMN may be referred to as third indication information. The third indication information is used to instruct the second AMF to update second configured network slice selection assistance information. The second configured network slice selection assistance information is configured network slice selection assistance information of the second PLMN of the terminal device. The configured network slice selection assistance information of the first PLMN of the terminal device herein is configured network slice selection assistance information, stored by the terminal device, of the first PLMN. Similarly, the configured network slice selection assistance information of the second PLMN of the terminal device is configured network slice selection assistance information, stored by the terminal device, of the second PLMN.

403. The UDM records that the first-type identifier needs to be sent to the one or more PLMNs.

The UDM may record, in a plurality of manners, whether the first-type identifier needs to be sent to the one or more PLMNs.

For example, in some embodiments, the UDM maintains two types of identifiers: a first-type identifier and a second-type identifier. For example, the UDM may directly store an identifier of each PLMN. The identifier of each PLMN is the first-type identifier or the second-type identifier. If a PLMN identifier is the first-type identifier, the first-type identifier needs to be sent to an AMF in the PLMN. If a PLMN identifier is the second-type identifier, the second-type identifier needs to be sent to an AMF in the PLMN. The second-type identifier is used to indicate that the AMF in the PLMN does not need to update configured network slice selection assistance information of the PLMN. For example, the UDM may set different values or different flag bits for the first-type identifier and the second-type identifier.

For another example, in some embodiments, the UDM may maintain one type of identifier: a first-type identifier. For example, the UDM may store an identifier of each PLMN, and the identifier of each PLMN is the first-type identifier or has no identifier. If a PLMN identifier is the first-type identifier, the first-type identifier needs to be sent to an AMF in the PLMN. If a PLMN has no identifier, no identifier needs to be sent to an AMF in the PLMN, or a second-type identifier needs to be sent to the AMF in the PLMN. The second-type identifier is used to indicate that the AMF in the PLMN does not need to update configured network slice selection assistance information of the PLMN.

For another example, in some embodiments, the UDM may maintain two lists: a list 1 and a list 2. When determining that the first-type identifier needs to be sent to the one or more PLMNs, the UDM may store identity information of the one or more PLMNs in the list 1, where the identity information may be a PLMN ID. When determining that the first-type identifier does not need to be sent to a specific PLMN, the UDM may delete identity information of the PLMN from the list 1, and store the identity information of the PLMN in the list 2.

For another example, in some embodiments, the UDM may maintain one list. When determining that the first-type identifier needs to be sent to the one or more PLMNs, the UDM may store identity information of the one or more PLMNs in the list. Alternatively, when determining that the first-type identifier does not need to be sent to a specific PLMN, the UDM may delete identity information of the PLMN from the list.

In addition to the foregoing manners of recording whether the first-type identifier needs to be sent to the one or more PLMNs, whether the first-type identifier needs to be sent to the one or more PLMNs may be recorded in another manner. In this embodiment of this application, a specific manner of recording whether the first-type identifier needs to be sent to the one or more PLMNs is not limited.

404. The terminal device generates requested network slice selection assistance information (Requested NSSAI) based on the configured network slice selection assistance information, and when registering with a specific PLMN, sends a registration request message that carries the requested network slice selection assistance information.

For example, the terminal device may store configured network slice selection assistance information of at least one PLMN, and the configured network slice selection assistance information that is used to generate the requested network slice selection assistance information is configured network slice selection assistance information of a PLMN with which the terminal device is to register.

Optionally, in some embodiments, the requested network slice selection assistance information may be a subset of the configured network slice selection assistance information. In some other embodiments, the requested network slice selection assistance information may be the same as the configured network slice selection assistance information.

For example, the terminal device sends the registration request message to a RAN device, and the RAN device selects a suitable AMF.

405. A first AMF obtains the requested network slice selection assistance information.

The first PLMN is a PLMN with which the terminal device applies for registration. The first AMF is a serving AMF of the terminal device. For example, the first AMF may be an AMF selected by the RAN device, or the RAN device selects the second AMF, and after receiving the registration request message, the second AMF forwards the registration request message to the first AMF that can serve the terminal device.

406. The first AMF sends, to the UDM, a request for obtaining subscription information of the terminal device.

For example, the first AMF may send a request to the UDM, to invoke a service of obtaining the subscription information of the terminal device.

407. The UDM determines, based on recorded information, that the first AMF needs to update first configured network slice selection assistance information.

For example, in step 401 to step 403, the UDM determines that the configured network slice selection assistance information of the first PLMN of the terminal device needs to be updated. In this case, the UDM records that the first-type identifier (namely, the first indication information) needs to be sent to the first PLMN.

408. The UDM sends first indication information and the subscription information of the terminal device to the first AMF. The subscription information of the terminal device includes the subscribed S-NSSAIs of the terminal device.

For example, after the service of obtaining the subscription information of the terminal device is invoked, the UDM returns the subscription information of the terminal device to the first AMF. In addition, the UDM sends the first indication information to the first AMF.

409. The UDM records that the AMF in the first PLMN does not need to update the first configured network slice selection assistance information.

As described above, in some embodiments, the UDM may maintain two types of identifiers: the first-type identifier and the second-type identifier. When determining that the AMF in the first PLMN does not need to update the first configured network slice selection assistance information, the UDM may modify an identifier of the first PLMN to the second-type identifier. In this way, the UDM records that the AMF in the first PLMN does not need to update the first configured network slice selection assistance information.

For another example, in some embodiments, the UDM may maintain one type of identifier: the first-type identifier. When determining that the AMF in the first PLMN does not need to update the first configured network slice selection assistance information, the UDM may erase the identifier of the first PLMN. In this way, the UDM records that the AMF in the first PLMN does not need to update the first configured network slice selection assistance information.

For another example, in some embodiments, the UDM may maintain two lists: the list 1 and the list 2. When determining that the AMF in the first PLMN does not need to update the first configured network slice selection assistance information, the UDM may delete identity information of the first PLMN from the list 1, and store the identity information of the first PLMN in the list 2. In this way, the UDM records that the AMF in the first PLMN does not need to update the first configured network slice selection assistance information.

For another example, in some embodiments, the UDM may maintain one list. When determining that the AMF in the first PLMN does not need to update the first configured network slice selection assistance information, the UDM may delete the identity information of the first PLMN from the list 1. In this way, the UDM records that the AMF in the first PLMN does not need to update the first configured network slice selection assistance information.

Optionally, in some embodiments, provided that the UDM sends the first indication information and the subscription information of the terminal device to the first AMF, the UDM may record that the AMF in the first PLMN does not need to update the first configured network slice selection assistance information.

Optionally, in some embodiments, before step 409, the UDM further needs to receive a notification message that is sent by the first AMF and is used to indicate that the update of the first configured network slice selection assistance information has been completed. In other words, the UDM records, only after determining that the update of the first configured network slice selection assistance information has been completed, that the AMF in the first PLMN does not need to update the first configured network slice selection assistance information. If the UDM has not received the notification message, step 409 is not performed. In this way, it can be ensured that an identifier of a PLMN maintained by the UDM is the same as an actual update result of configured network slice selection assistance information of the PLMN of the terminal device.

Further, optionally, in some embodiments, the UDM may send a subscription request to the first AMF, where the subscription request is used to request the first AMF to send a notification message to the UDM after the update of the first configured network slice selection assistance information is completed. In other words, the UDM may instruct, by sending the subscription request, the first AMF to send or not to send the notification message to the UDM. Optionally, in some other embodiments, the first AMF may send, by default, the notification message to the UDM after the update of the first configured network slice selection assistance information is completed. In other words, the first AMF sends, to the UDM without a need of receiving the subscription request from the UDM, the notification message that is used to indicate that the update of the first configured network slice selection assistance information is completed.

It is assumed that after step 409, the terminal device is powered on after being powered off, or the terminal device moves and then registers with another AMF in the first PLMN, or the terminal device moves to another PLMN and then moves back to the first PLMN. It is assumed that in the foregoing process, the subscribed S-NSSAIs of the terminal device are not updated. In other words, in the foregoing process, the record by the UDM for the first PLMN does not change (that is, it remains unnecessary for the AMF in the first PLMN to update the first configured network slice selection assistance information). In this case, after obtaining a request that is for obtaining the subscription information and that is sent by the first AMF or the other AMF in the first PLMN, the UDM determines that the first AMF or the other AMF in the first PLMN does not need to update the first configured network slice selection assistance information. In this way, the UDM may instruct the first AMF or the other AMF in the first PLMN not to update the first configured network slice selection assistance information, or the UDM does not send, to the first AMF or the other AMF in the first PLMN, indication information that is used to indicate whether to update the first configured network slice selection assistance information.

It is assumed that after step 409, the terminal device switches from the first PLMN to the second PLMN. In addition, it is assumed that the second AMF becomes an AMF that serves the terminal device. It is assumed that in the foregoing process, a record of the second PLMN maintained by the UDM does not change (that is, it remains necessary for the AMF of the second PLMN to update the second configured network slice selection assistance information). In this case, after obtaining a request that is for obtaining the subscription information and that is sent by the second AMF, the UDM determines that the second AMF needs to update the second configured network slice selection assistance information. In this way, the UDM may instruct the second AMF to update the second configured network slice selection assistance information.

According to the foregoing technical solutions, the UDM may determine, based on a record, whether indication information that is used to instruct an AMF in a PLMN to update the first configured network slice selection assistance information needs to be sent to the AMF.

It can be understood that in the method shown in FIG. 4, step 401 to step 403 may be performed only when the UDM determines that configured network slice selection assistance information of the PLMN of the terminal device needs to be updated.

That the first AMF initiates an update of first configured network slice selection assistance information may include the following steps: updating, by the AMF based on the subscribed S-NSSAIs of the terminal device, the configured network slice selection assistance information of the first PLMN of the terminal device; and sending updated configured NSSAI of the first PLMN to the terminal device. For example, the first AMF updates the configured network slice selection assistance information of the first PLMN of the terminal device based on the subscribed S-NSSAIs of the terminal device and S-NSSAIs corresponding to a network slice supported by the first PLMN. For example, the first AMF determines an intersection set of the subscribed S-NSSAIs and the S-NSSAIs corresponding to the network slice supported by the first PLMN or a subset of the intersection set as the configured network slice selection assistance information of the first PLMN of the terminal device, to implement the update.

The AMF adds the updated configured NSSAI of the first PLMN to a registration accept message, and sends the registration accept message to the terminal device. Alternatively, the AMF sends the updated configured NSSAI of the first PLMN to the terminal device using a UE configuration update command.

In addition, before the AMF updates the configured network slice selection assistance information of the first PLMN of the terminal device based on the subscribed S-NSSAIs of the terminal device, the AMF may determine again whether an update needs to be initiated. For such a manner, refer to description about FIG. 6. Details are not described herein. The subscribed S-NSSAIs of the terminal device herein are the subscribed S-NSSAIs of the terminal device included in the subscription information of the terminal device in step 408.

After completing the update, the terminal device may send a notification message to the first AMF. The notification message is used to indicate that the terminal device has completed the update of the first configured network slice selection assistance information.

Optionally, in some embodiments, the notification message that is sent by the first AMF to the UDM and is used to indicate that the update of the first configured network slice selection assistance information has been completed may be the same as the notification message received by the first AMF from the terminal device. In other words, the first AMF may transparently transmit the notification message to the UDM.

Optionally, in some other embodiments, after receiving the notification message from the terminal device, the first AMF may determine a notification message that is used to indicate that the update of the first configured network slice selection assistance information has been completed. Content indicated by the notification message determined by the first AMF may be the same as that indicated by the notification message received by the first AMF, but specific message lengths or specific forms may be different. For example, the notification message sent by the terminal device to the first AMF may be an explicit notification message, and the notification message sent by the first AMF to the UDM may be an implicit notification message.

In the method shown in FIG. 4, when receiving, from the first AMF, the request for obtaining the subscription information of the terminal device, the UDM determines, based on a stored identifier, whether the first AMF needs to update the first configured network slice selection assistance information. Optionally, in some other embodiments, when an AMF registers as an AMF that serves the terminal device, the UDM may determine, based on a record, whether the AMF needs to be instructed to update corresponding configured network slice selection assistance information. For example, the first AMF registers with the UDM as the AMF that serves the terminal device. In this case, the UDM determines, based on a record, that the first AMF needs to be instructed to update the first configured network slice selection assistance information, and performs subsequent steps.

Figure 5:
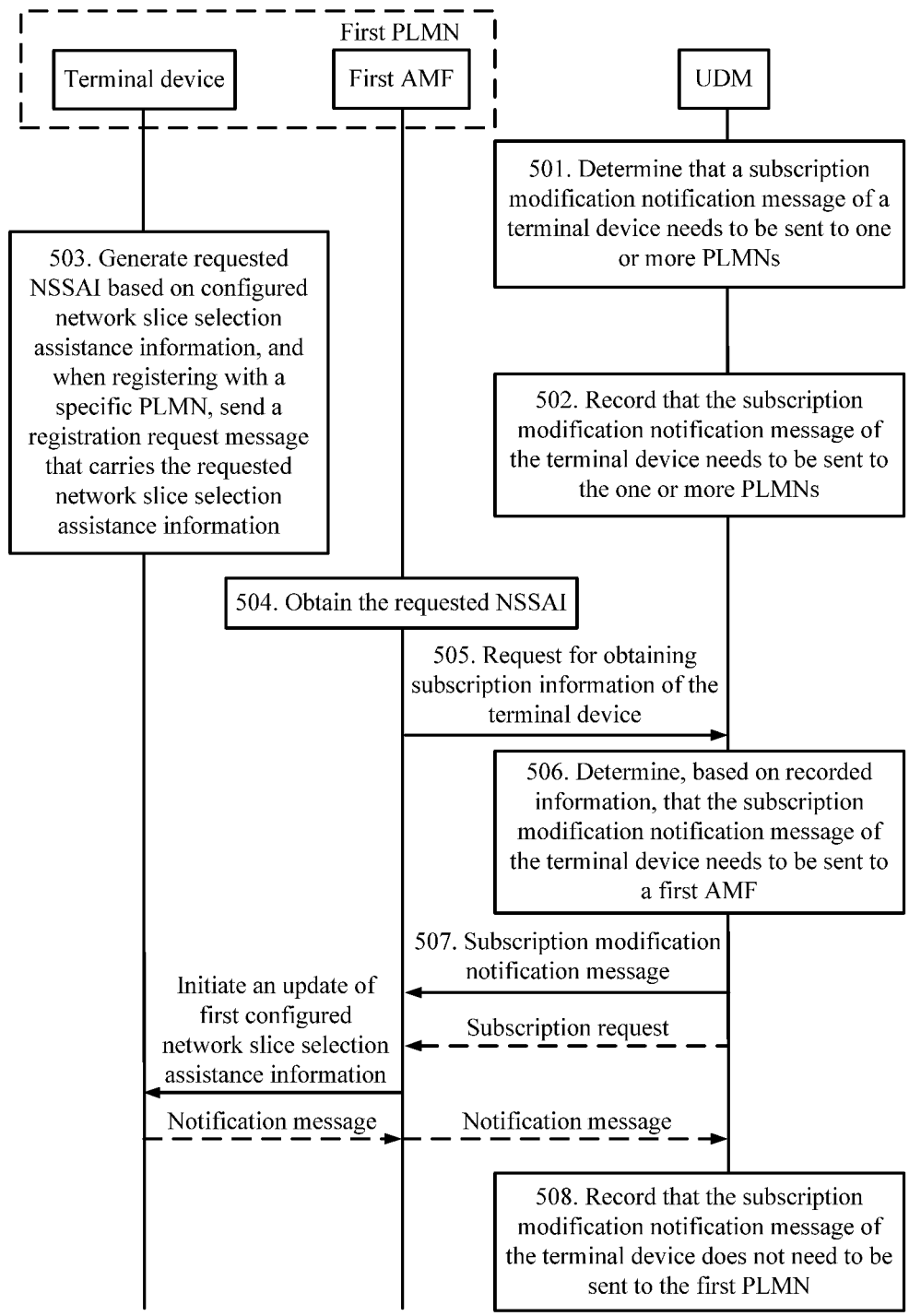
FIG. 5 is a schematic flowchart of another communication method according to an embodiment of this application.

FIG. 5 is a schematic flowchart of another communication method according to an embodiment of this application.

501. When determining that subscribed S-NSSAIs of a terminal device change, a UDM determines that a subscription modification notification message of the terminal device needs to be sent to one or more PLMNs.

The one or more PLMNs include a first PLMN. The UDM is a UDM in a home PLMN of the terminal device.

502. The UDM records that the subscription modification notification message of the terminal device needs to be sent to the one or more PLMNs. The subscription modification notification message of the terminal device includes the subscribed S-NSSAIs of the terminal device.

The UDM may record, in a plurality of manners, whether the subscription modification notification message of the terminal device needs to be sent to the one or more PLMNs.

For example, in some embodiments, the UDM may maintain two types of identifiers: a first-type identifier and a second-type identifier. An identifier of each PLMN is the first-type identifier or the second-type identifier. If a PLMN identifier is the first-type identifier, the subscription modification notification message of the terminal device needs to be sent to an AMF in the PLMN. If a PLMN identifier is the second-type identifier, the subscription modification notification message of the terminal device does not need to be sent to an AMF in the PLMN. When determining that the subscription modification notification message of the terminal device needs to be sent to the one or more PLMNs, the UDM may generate a first-type identifier for each of the one or more PLMNs. For convenience of description, a first-type identifier of the first PLMN may be referred to as first indication information. It is assumed that the one or more PLMNs further include a second PLMN. The UDM stores the first-type identifier of each of the one or more PLMNs.

For another example, in some embodiments, the UDM may maintain one type of identifier: a first-type identifier. An identifier of each PLMN is the first-type identifier. If a PLMN identifier is the first-type identifier, the subscription modification notification message of the terminal device needs to be sent to an AMF in the PLMN. If a PLMN has no identifier, the subscription modification notification message of the terminal device does not need to be sent to an AMF in the PLMN. When determining that the subscription modification notification message of the terminal device needs to be sent to the one or more PLMNs, the UDM may generate a first-type identifier for each of the one or more PLMNs. For convenience of description, a first-type identifier of the first PLMN may be referred to as first indication information. It is assumed that the one or more PLMNs further include a second PLMN. The UDM stores the first-type identifier of each of the one or more PLMNs.

In the foregoing two embodiments, the first indication information is used to record that the subscription modification notification message of the terminal device needs to be sent to the AMF in the first PLMN. In other words, step 502 may be such that the UDM generates first indication information. The first indication information is used to record that the subscription modification notification message of the terminal device needs to be sent to the AMF in the first PLMN.

For another example, in some embodiments, the UDM may maintain two lists: a list 1 and a list 2. When determining that the subscription modification notification message of the terminal device needs to be sent to the one or more PLMNs, the UDM may store identity information of the one or more PLMNs in the list 1, where the identity information may be a PLMN ID. When determining that the subscription modification notification message of the terminal device does not need to be sent to a specific PLMN, the UDM may delete identity information of the PLMN from the list 1, and store the identity information of the PLMN in the list 2.

For another example, in some embodiments, the UDM may maintain one list. When determining that the subscription modification notification message of the terminal device needs to be sent to the one or more PLMNs, the UDM may store identity information of the one or more PLMNs in the list. When determining that the subscription modification notification message of the terminal device does not need to be sent to a specific PLMN, the UDM may delete identity information of the PLMN from the list.

In addition to the foregoing manners of recording whether the subscription modification notification message of the terminal device needs to be sent to the one or more PLMNs, whether the subscription modification notification message of the terminal device needs to be sent to the one or more PLMNs may be recorded in another manner. In this embodiment of this application, a specific manner of recording whether the subscription modification notification message of the terminal device needs to be sent to the one or more PLMNs is not limited.

Steps 503 to 505 are the same as steps 404 to 406, and details are not described herein again.

506. The UDM determines, based on recorded information, that the subscription modification notification message of the terminal device needs to be sent to a first AMF.

For example, in step 501 and step 502, the UDM determines that the subscription modification notification message of the terminal device needs to be sent to the AMF in the first PLMN.

507. The UDM sends the subscription modification notification message of the terminal device to the first AMF.

508. The UDM records that the subscription modification notification message of the terminal device does not need to be sent to the first PLMN.

The UDM may record, in a plurality of manners, that the subscription modification notification message of the terminal device does not need to be sent to the first PLMN.

As described above, in some embodiments, the UDM may maintain two types of identifiers: the first-type identifier and the second-type identifier. When determining that the subscription modification notification message of the terminal device does not need to be sent to the first PLMN, the UDM may modify an identifier of the first PLMN to the second-type identifier. In this way, the UDM records that the subscription modification notification message of the terminal device does not need to be sent to the first PLMN.

For another example, in some embodiments, the UDM may maintain one type of identifier: the first-type identifier. When determining that the subscription modification notification message of the terminal device does not need to be sent to the first PLMN, the UDM may erase the identifier of the first PLMN. In this way, the UDM records that the subscription modification notification message of the terminal device does not need to be sent to the first PLMN.

For another example, in some embodiments, the UDM may maintain two lists: the list 1 and the list 2. When determining that the subscription modification notification message of the terminal device does not need to be sent to the first PLMN, the UDM may delete the identity information of the first PLMN from the list 1, and store the identity information of the first PLMN in the list 2. In this way, the UDM records that the subscription modification notification message of the terminal device does not need to be sent to the first PLMN.

For another example, in some embodiments, the UDM may maintain one list. When determining that the subscription modification notification message of the terminal device does not need to be sent to the first PLMN, the UDM may delete the identity information of the first PLMN from the list 1. In this way, the UDM records that the subscription modification notification message of the terminal device does not need to be sent to the first PLMN.

Optionally, in some embodiments, provided that the UDM sends the subscription modification notification message of the terminal device to the first AMF, the UDM may record that the subscription modification notification message of the terminal device does not need to be sent to the first PLMN.

Optionally, in some other embodiments, before step 508, the UDM further needs to receive a notification message that is sent by the first AMF and is used to indicate that the first AMF has completed an update of configured network slice selection assistance information of the first PLMN of the terminal device. In other words, the UDM records, only after determining that the AMF has completed the update of the configured network slice selection assistance information of the first PLMN of the terminal device, that the subscription modification notification message of the terminal device does not need to be sent to the first PLMN. If the UDM has not received the notification message, step 508 is not performed. In this way, it can be ensured that an identifier of a PLMN maintained by the UDM is the same as an actual update result of configured network slice selection assistance information of the PLMN of the terminal device.

Further, optionally, in some embodiments, the UDM may send a subscription request to the first AMF, where the subscription request is used to request the first AMF to send a notification message to the UDM after the update of the configured network slice selection assistance information of the first PLMN of the terminal device is completed. In other words, the UDM may instruct, by sending the subscription request, the first AMF to send or not to send the notification message to the UDM. Optionally, in some other embodiments, the first AMF may send, by default, the notification message to the UDM after the update of the configured network slice selection assistance information of the first PLMN of the terminal device is completed. In other words, the first AMF sends, to the UDM without a need of receiving the subscription request from the UDM, the notification message that is used to indicate that the update of the configured network slice selection assistance information of the first PLMN of the terminal device has been completed.

It is assumed that after step 508, the terminal device is powered on after being powered off, or the terminal device moves and then registers with another AMF in the first PLMN, or the terminal device moves to another PLMN and then moves back to the first PLMN. It is assumed that in the foregoing process, the subscribed S-NSSAIs of the terminal device are not updated. In other words, in the foregoing process, the record by the UDM for the first PLMN does not change (that is, it remains unnecessary to send the subscription modification notification message of the terminal device to the first PLMN). In this case, after obtaining a request that is for obtaining subscription information and that is sent by the first AMF or the other AMF in the first PLMN, the UDM determines that the subscription modification notification message of the terminal device does not need to be sent to the first AMF or the other AMF in the first PLMN. It is assumed that after step 508, the terminal device switches from the first PLMN to the second PLMN. In addition, it is assumed that the second AMF becomes an AMF that serves the terminal device, where the second AMF is an AMF in the second PLMN. It is assumed that in the foregoing process, the record by the UDM for the second PLMN does not change (that is, it remains necessary to send the subscription modification notification message of the terminal device to the second PLMN). In this case, after obtaining a request that is for obtaining the subscription information and that is sent by the second AMF, the UDM determines that the subscription modification notification message of the terminal device needs to be sent to the second AMF. In this way, the UDM may send the subscription modification notification message of the terminal device to the second AMF.

According to the foregoing technical solutions, the UDM may determine, based on a record, whether the subscription modification notification message of the terminal device needs to be sent to an AMF in a PLMN.

It can be understood that in the method shown in FIG. 5, step 501 and step 502 may be performed only when the UDM determines that the subscribed S-NSSAIs of the terminal device change.

In the foregoing technical solutions, after receiving the subscription modification notification message of the terminal device from the UDM, the first AMF initiates the update of the configured network slice selection assistance information of the first PLMN of the terminal device.

For how the first AMF initiates the update of the configured network slice selection assistance information of the first PLMN of the terminal device, refer to description about FIG. 4. Details are not described herein again. A difference from FIG. 5 lies in that the subscribed S-NSSAIs of the terminal device herein are the subscribed S-NSSAIs of the terminal device included in the subscription modification notification message of the terminal device in step 507.

After completing the update, the terminal device may send a notification message to the first AMF. The notification message is used to indicate that the terminal device has completed the update of first configured network slice selection assistance information.

Optionally, in some embodiments, the notification message that is sent by the first AMF to the UDM and is used to indicate that the update of the first configured network slice selection assistance information has been completed may be the same as the notification message received by the first AMF from the terminal device. In other words, the first AMF may transparently transmit the notification message to the UDM.

Optionally, in some other embodiments, after receiving the notification message from the terminal device, the first AMF may determine a notification message that is used to indicate that the update of the first configured network slice selection assistance information has been completed. Content indicated by the notification message determined by the first AMF may be the same as that indicated by the notification message received by the first AMF, but specific message lengths or specific forms may be different. For example, the notification message sent by the terminal device to the first AMF may be an explicit notification message, and the notification message sent by the first AMF to the UDM may be an implicit notification message.

In the method shown in FIG. 5, when receiving, from the first AMF, the request for obtaining the subscription information of the terminal device, the UDM determines, based on a record, whether the subscription modification notification message of the terminal device needs to be sent to the first AMF. Optionally, in some other embodiments, when an AMF registers as an AMF that serves the terminal device, the UDM may determine, based on a record, whether the subscription modification notification message of the terminal device needs to be sent to the AMF. For example, the first AMF registers with the UDM as the AMF that serves the terminal device. In this case, the UDM determines, based on a record, that the subscription modification notification message of the terminal device needs to be sent to the first AMF, and performs subsequent steps.

Figure 6:
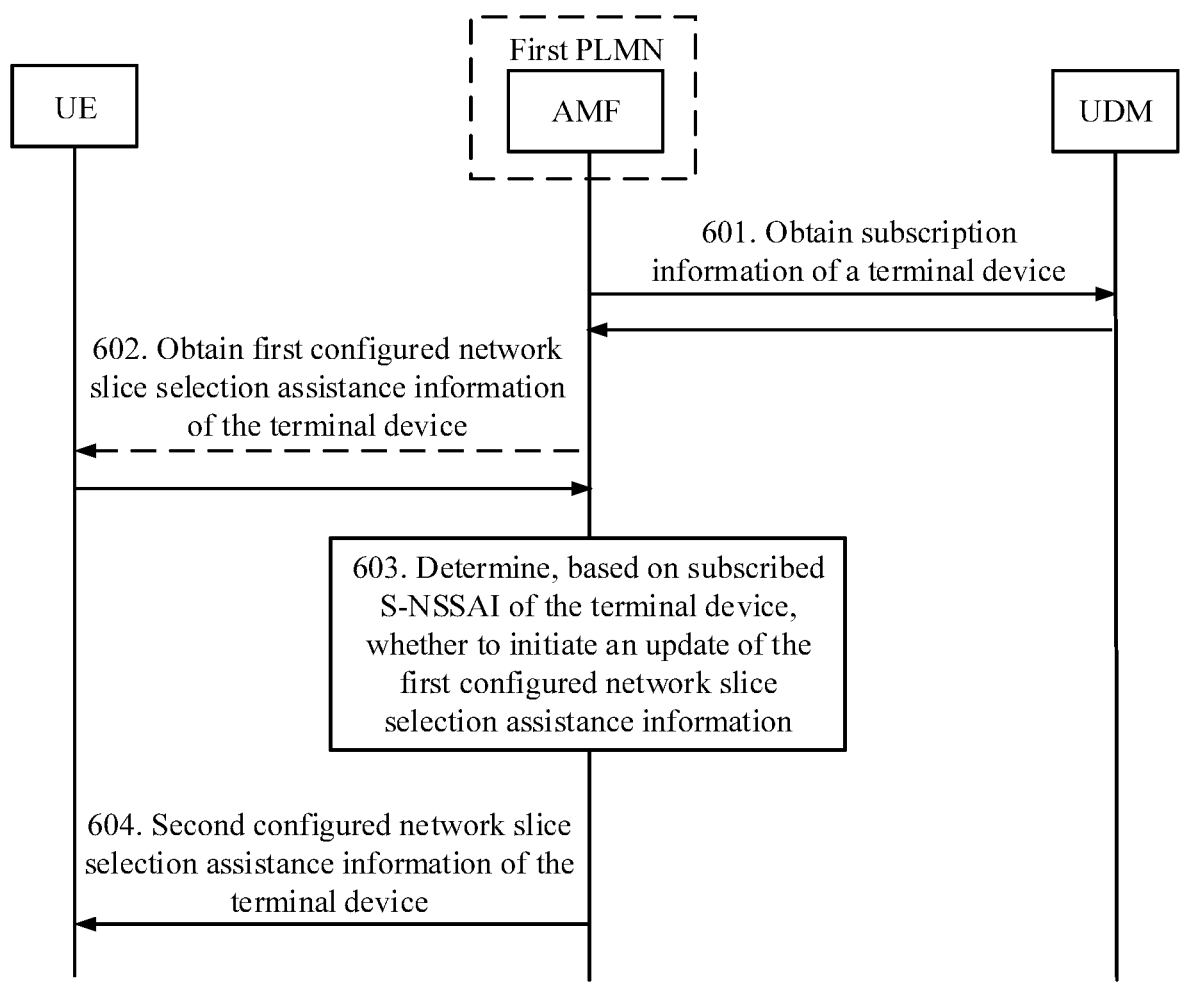
FIG. 6 is a schematic flowchart of another communication method according to an embodiment of this application.

FIG. 6 is a schematic flowchart of another communication method according to an embodiment of this application.

601. An AMF obtains subscribed S-NSSAIs of a terminal device.

The AMF is an AMF that serves the terminal device, namely, a serving AMF.

Optionally, in some embodiments, the AMF may receive the subscribed S-NSSAIs of the terminal device from a UDM.

Optionally, in some other embodiments, the AMF may receive the subscribed S-NSSAIs of the terminal device from another AMF.

602. The AMF obtains first configured network slice selection assistance information of the terminal device.

The first configured network slice selection assistance information is configured network slice selection assistance information of a PLMN with which the terminal device requests to register, and the PLMN with which the terminal device requests to register is a PLMN in which the AMF is located.

Optionally, in some embodiments, a registration request message sent by the terminal device to the AMF carries the first configured network slice selection assistance information, and the AMF obtains the first configured network slice selection assistance information from the terminal device.

Optionally, in some other embodiments, the terminal device may add, only during initial registration, the first configured network slice selection assistance information to a registration request message sent to the AMF. In this case, a registration type included in the registration request message is an initial registration type of registration. In other words, the registration request message includes the first configured network slice selection assistance information of the terminal device only when the registration type in the registration request message is an initial registration type of registration. In this case, the AMF obtains the first configured network slice selection assistance information from an initial registration request message sent by the terminal device.

Optionally, in some other embodiments, the terminal device may add, only during initial registration or PLMN switching, the first configured network slice selection assistance information to a registration request message sent to the AMF. In this case, during initial registration, a registration type included in the registration request message is an initial registration type of registration. PLMN switching triggers a mobility registration update. In this case, a registration type included in the registration request message sent by the terminal device is a mobility registration update type of registration. In other words, the registration request message includes the first configured network slice selection assistance information of the terminal device only when the registration type in the registration request message is a mobility registration update type of registration.

Optionally, in some other embodiments, the AMF may obtain the first configured network slice selection assistance information from a context of the terminal device. In this case, the AMF obtains the context of the terminal device, and obtains the first configured network slice selection assistance information from the context. According to the technical solutions, the terminal device does not need to add the first configured network slice selection assistance information to a registration request message, thereby reducing some signaling overheads. The first PLMN is the PLMN with which the terminal device requests to register. The AMF is an AMF in the first PLMN.

Optionally, in some other embodiments, the AMF may send a request message for the configured network slice selection assistance information to the terminal device, where the request message for the configured network slice selection assistance information is used to request the terminal device to send the first configured network slice selection assistance information to the AMF. For example, after the terminal device sends the registration request, the AMF may send the request message for the configured network slice selection assistance information to the terminal device. As another example, after the terminal device sends the initial registration request, the AMF may send the request message for the configured network slice selection assistance information to the terminal device. As yet another example, when determining that the terminal device switches from a second PLMN to the first PLMN, the AMF sends the request message for the configured network slice selection assistance information to the terminal device.

603. The AMF determines, based on the subscribed S-NSSAIs of the terminal device, whether to update the first configured network slice selection assistance information.

604. If the AMF determines that the update of the first configured network slice selection assistance information needs to be initiated, the AMF determines second configured network slice selection assistance information based on the subscribed S-NSSAIs, and sends the second configured network slice selection assistance information to the terminal device.

Optionally, in some embodiments, the AMF may determine whether the first configured network slice selection assistance information is the same as the subscribed S-NSSAIs of the terminal device. If the first configured network slice selection assistance information is different from the subscribed S-NSSAIs, the AMF determines that the first configured network slice selection assistance information needs to be updated. For example, the first PLMN is an HPLMN of the terminal device, and the AMF determines, based on the subscribed S-NSSAIs of the terminal device, whether one or more S-NSSAIs included in the first configured network slice selection assistance information are the same as the subscribed S-NSSAIs of the terminal device. If the one or more S-NSSAIs included in the first configured network slice selection assistance information are the same as the subscribed S-NSSAIs of the terminal device, the update of the first configured network slice selection assistance information does not need to be initiated. Alternatively, if the one or more S-NSSAIs included in the first configured network slice selection assistance information are different from the subscribed S-NSSAIs of the terminal device, the update of the first configured network slice selection assistance information needs to be initiated. In this case, the AMF may update the first configured network slice selection assistance information to the second configured network slice selection assistance information, where one or more S-NSSAIs included in the second configured network slice selection assistance information are the same as the subscribed S-NSSAIs.

Optionally, in some other embodiments, the AMF may determine, based on the first configured network slice selection assistance information, the subscribed S-NSSAIs, and a mapping relationship between the first configured network slice selection assistance information and configured network slice selection assistance information of a home public land network of the terminal device, whether the update of the configured network slice selection assistance information needs to be updated. For example, the first PLMN is a visited PLMN (VPLMN) of the terminal device, and the AMF determines, based on the first configured network slice selection assistance information, the subscribed S-NSSAIs, and the mapping relationship between the first configured network slice selection assistance information and configured network slice selection assistance information of a home public land network of the terminal device, whether the update of the first configured network slice selection assistance information needs to be invoked. For example, the first PLMN is a VPLMN of the terminal device, and the first configured network slice selection assistance information is configured network slice selection assistance information of the VPLMN of the terminal device. There may be a correspondence between the configured network slice selection assistance information of the VPLMN and the configured network slice selection assistance information of the HPLMN. For example, Table 1 shows the correspondence between the configured network slice selection assistance information of the VPLMN and the configured network slice selection assistance information of the HPLMN.

TABLE 1

| Configured network slice selection assistance information of a VPLMN | Configured network slice selection assistance information of an HPLMN |
|---|---|
| S-NSSAI 1, S-NSSAI 2 | S-NSSAI 11 |
| S-NSSAI 3 | S-NSSAI 21 |
| S-NSSAI 4 | S-NSSAI 31 |

As shown in Table 1, the S-NSSAI 1 and the S-NSSAI 2 in the configured network slice selection assistance information of the VPLMN correspond to the S-NSSAI 11 in the configured network slice selection assistance information of the HPLMN; the S-NSSAI 3 in the configured network slice selection assistance information of the VPLMN corresponds to the S-NSSAI 21 in the configured network slice selection assistance information of the HPLMN; and the S-NSSAI 4 in the configured network slice selection assistance information of the VPLMN corresponds to the S-NSSAI 31 in the configured network slice selection assistance information of the HPLMN. It is assumed that, network slices corresponding to the S-NSSAI 1, the S-NSSAI 2, the S-NSSAI 3, and the S-NSSAI 4 are deployed on the VPLMN.

The AMF determines, based on the subscribed S-NSSAIs of the terminal device and the mapping relationship between the first configured network slice selection assistance information and the configured network slice selection assistance information of the home public land network of the terminal device, third configured network slice selection assistance information corresponding to the subscribed S-NSSAIs of the terminal device. The AMF also determines whether S-NSSAI corresponding to the first configured network slice selection assistance information is the same as S-NSSAI corresponding to the third configured network slice selection assistance information. If the S-NSSAI corresponding to the first configured network slice selection assistance information is the same as the S-NSSAI corresponding to the third configured network slice selection assistance information, the AMF determines that the update does not need to be initiated. If the S-NSSAI corresponding to the first configured network slice selection assistance information is different from the S-NSSAI corresponding to the third configured network slice selection assistance information, the AMF determines that the update needs to be initiated.

Table 1 is used as an example. Assuming that the subscribed S-NSSAIs include the S-NSSAI 11, the S-NSSAI 21, and the S-NSSAI 31, and that the first configured network slice selection assistance information includes the S-NSSAI 1, the S-NSSAI 2, the S-NSSAI 3, and the S-NSSAI 4, the AMF determines that the first configured network slice selection assistance information does not need to be updated. Assuming that the subscribed S-NSSAIs of the terminal device include the S-NSSAI 11, the S-NSSAI 21, and the S-NSSAI 31, and that the first configured network slice selection assistance information includes the S-NSSAI 1, the S-NSSAI 2, and the S-NSSAI 3, the AMF determines that the first configured network slice selection assistance information needs to be updated. The AMF may determine, based on the subscribed S-NSSAIs and the mapping relationship between the first configured network slice selection assistance information and the configured network slice selection assistance information of the home public land network of the terminal device, that the second configured network slice selection assistance information includes: the S-NSSAI 1, the S-NSSAI 2, the S-NSSAI 3, and the S-NSSAI 4. Optionally, in some embodiments, after determining the second configured network slice selection assistance information, the AMF may store the second configured network slice selection assistance information in the context of the terminal device, such that when the terminal device registers with another AMF, the other AMF may directly obtain the second configured network slice selection assistance information from the context of the terminal device.

Figure 7:
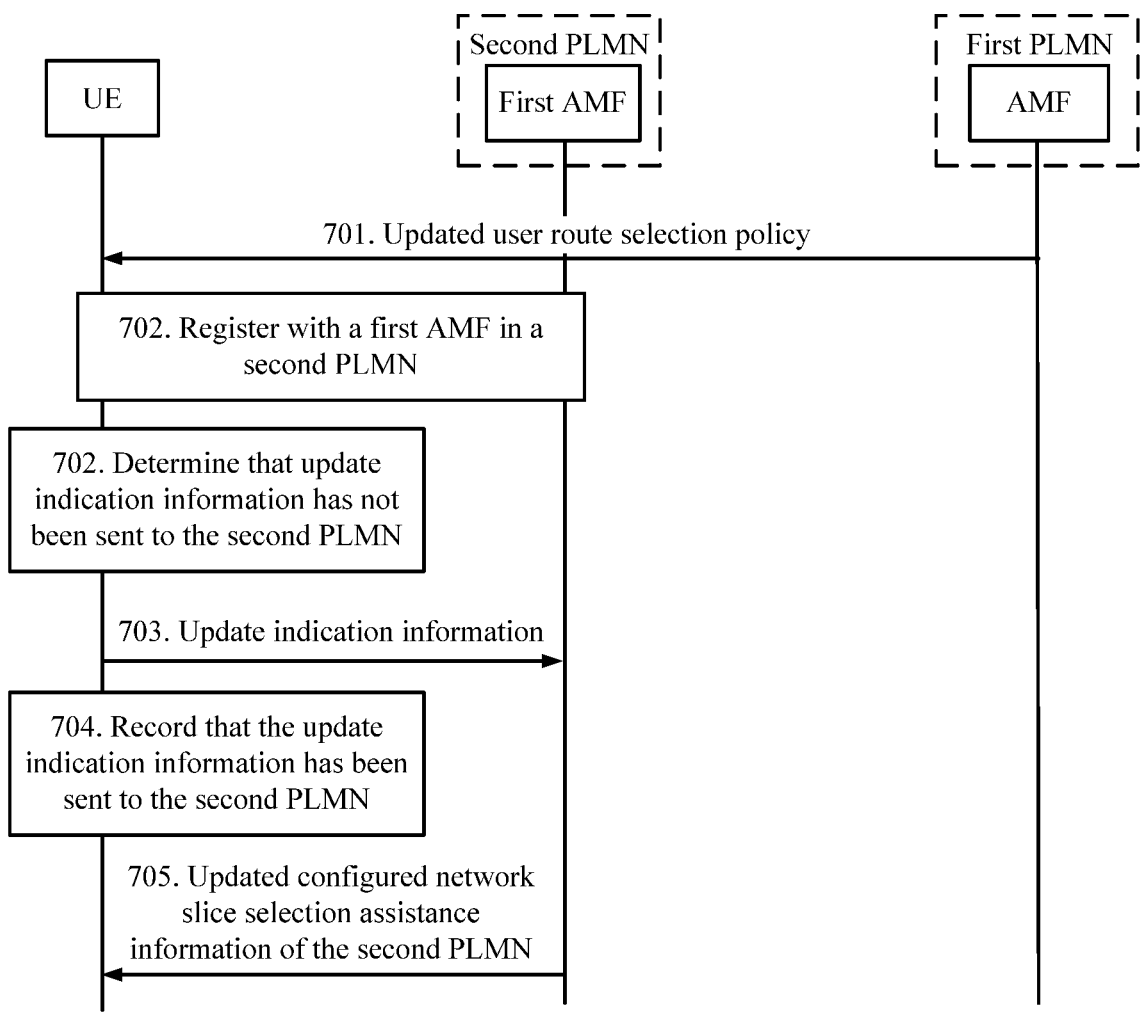
FIG. 7 is a schematic flowchart of another communication method according to an embodiment of this application.

FIG. 7 is a schematic flowchart of another communication method according to an embodiment of this application.

701. A terminal device registers with a first PLMN, and receives an updated UE route selection policy (URSP).

702. The terminal device registers with a first AMF in a second PLMN, and the terminal device determines that update indication information has not been sent to any AMF in the second PLMN.

703. The terminal device sends the update indication information to the first AMF, where the update indication information is used to instruct the first AMF to send updated configured network slice selection assistance information of the second PLMN to the terminal device.

704. The terminal device records that the update indication information has been sent to the second PLMN.

705. The first AMF sends the updated configured network slice selection assistance information of the second PLMN to the terminal device.

In the foregoing technical solutions, the terminal device may determine, based on update of the URSP, that configured network slice selection assistance information of each PLMN needs to be updated. Additionally, when registering with a corresponding PLMN, the terminal device proactively initiates, based on a determining result, an update of configured network slice selection assistance information of the PLMN of the terminal device.

Figure 10:
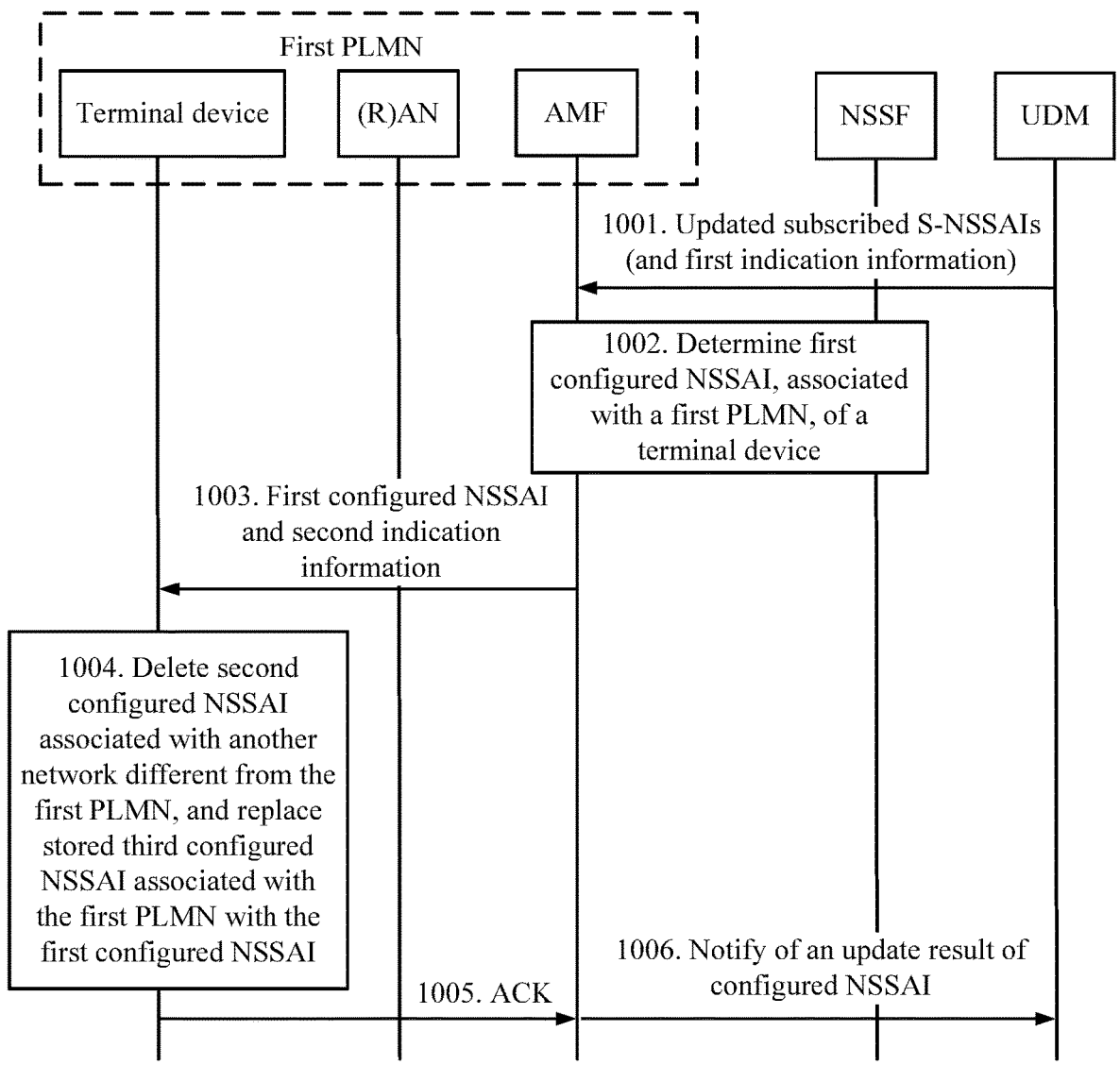
FIG. 10 is a schematic flowchart of still another communication method according to an embodiment of this application.

FIG. 10 is a schematic flowchart of another communication method according to an embodiment of this application.

The method is related to at least interaction between a terminal device, an AMF, and a UDM. For example, the terminal device, the AMF, and the UDM may be respectively the terminal device 110, the access and mobility management function network element 120, and the unified data management network element 130 in FIG. 1. Details are not described herein again. The terminal device and the AMF are located in a first PLMN. In other words, the first PLMN is a PLMN that currently serves the terminal device. The first PLMN may be an HPLMN or a VPLMN. The UDM is located in the HPLMN of the terminal device.

As shown in FIG. 10, the method includes the following steps.

1001. The UDM sends updated subscribed network slice selection assistance information (updated Subscribed S-NSSAIs) of the terminal device to the AMF in the first PLMN. For example, the updated subscribed S-NSSAIs of the terminal device are used to identify one or more network slices accessible by the terminal device in the first PLMN after subscribed S-NSSAIs are updated.

For example, after subscribed S-NSSAIs in subscription data of the terminal device are updated, the UDM may notify the AMF in the first PLMN of the updated subscribed S-NSSAI by invoking a subscriber data management (SDM) notification (Nudm_SDM_Notification) service of the UDM. In addition, the UDM may send the subscribed S-NSSAIs and first indication information to the AMF in the first PLMN by invoking a Nudm_SDM_Get service. The first indication information is used to indicate that the subscribed S-NSSAIs are updated. That is, the subscribed S-NSSAIs are updated subscribed S-NSSAIs.

Optionally, after receiving the updated subscribed S-NSSAIs (or the updated subscribed S-NSSAIs and the first indication information), the AMF may return an acknowledgement (ACK) message to the UDM.

1002. The AMF determines first configured network slice selection assistance information (first configured NSSAI) associated with the first PLMN, of the terminal device.

The first configured NSSAI associated with the first PLMN, of the terminal device is used to identify a network slice that is configured in the first PLMN and that is accessible by the terminal device. Functions of second configured NSSAI and third configured NSSAI mentioned below are similar to the function of the first configured NSSAI, and details are not described again.

For example, after receiving the first indication information from the UDM, the AMF determines to update the configured NSSAI of the first PLMN. In other words, when the subscribed S-NSSAIs of the first PLMN are updated, the AMF determines to update the configured NSSAI of the first PLMN. In addition, when the first PLMN is a VPLMN, the AMF may determine to update a correspondence between the configured NSSAI of the first PLMN and configured NSSAI of the HPLMN. Alternatively, the AMF may initiate only the update of the correspondence between the configured NSSAI of the first PLMN and the configured NSSAI of the HPLMN. This is not limited herein.

For example, after receiving the updated subscribed S-NSSAIs from the UDM, the AMF may determine the first configured NSSAI of the first PLMN based on the updated subscribed S-NSSAIs. Alternatively, after receiving the updated subscribed S-NSSAIs from the UDM, the AMF may obtain the first configured NSSAI from a network slice selection function (NSSF) network element. A function of the NSSF network element includes selecting a network slice for the terminal device. Therefore, the AMF obtains the first configured NSSAI, associated with the first PLMN, of the terminal device. Optionally, the AMF obtains a correspondence between the first configured NSSAI and the configured NSSAI of the HPLMN based on the obtained first configured NSSAI.

1003. The AMF sends the first configured NSSAI (and/or a correspondence between the first configured NSSAI and configured NSSAI of the HPLMN) and second indication information to the terminal device. The second indication information is used to instruct the terminal device to delete second configured NSSAI associated with another network than the first PLMN.

As described above, when the subscribed S-NSSAIs of the first PLMN are updated, the AMF determines to update the configured NSSAI of the first PLMN, and further sends the second indication information to the UE in step 1003. In other words, the AMF sends the second indication information to the UE in step 1003 only when the AMF is notified that the subscribed S-NSSAIs of the first PLMN are updated.

For example, the AMF may send a UE configuration update command to the terminal device, where the user equipment configuration update command includes the first configured NSSAI and the second indication information. Alternatively, the AMF may send a registration accept message to the terminal device, where the registration accept message includes the first configured NSSAI and the second indication information. This is not limited herein in this application. The foregoing message may be sent by the AMF to an (R)AN device, and then the (R)AN device forwards the message to the terminal device.

The "other network than the first PLMN" herein may be a network other than the first PLMN, such as another PLMN different from the first PLMN in a network range that may be accessed by the terminal.

Optionally, the second indication information is further used to instruct the terminal device to delete allowed NSSAI associated with the other network than the first PLMN. Allowed NSSAI associated with a network is used to identify a network slice, to which the terminal device is allowed to access, in the first PLMN.

Optionally, the second indication information is further used to instruct the terminal device to delete a correspondence between the second configured NSSAI associated with the other network and the configured NSSAI of the HPLMN. Optionally, the second indication information is further used to instruct the terminal device to delete a correspondence between the allowed NSSAI associated with the other network and the configured NSSAI of the HPLMN.

1004. After receiving the first configured NSSAI and the second indication information, the terminal device deletes second configured NSSAI associated with the other network than the first PLMN, and replaces stored third configured NSSAI associated with the first PLMN with the first configured NSSAI.

Optionally, when the second indication information is further used to instruct the terminal device to delete the correspondence between the second configured NSSAI associated with the other network and the configured NSSAI of the HPLMN, after receiving the indication information sent in step 1003, the terminal device further deletes the correspondence between the second configured NSSAI and the configured NSSAI of the HPLMN.

Therefore, according to the foregoing solution, when subscription data modification of the terminal device results in a change of configured NSSAI of the terminal device in a current PLMN, the AMF sends updated configured NSSAI of the current PLMN to the terminal device, and instructs the terminal device to delete previously stored configured NSSAI of another PLMN. In this way, when the terminal device registers with the other PLMN next time, because the terminal device does not store the configured NSSAI corresponding to the PLMN, the terminal device does not add requested NSSAI to a registration request. Therefore, a network side provides the terminal device with a piece of configured NSSAI of the PLMN based on current subscription information of the terminal device. As such, the configured NSSAI of the PLMN can be updated in time, thereby improving user experience of the terminal device and saving network resources.

Optionally, when the second indication information is further used to instruct the terminal device to delete the allowed NSSAI associated with the other network, after receiving the indication information sent in step 1003, the terminal device further deletes the allowed NSSAI associated with the other network. Optionally, the terminal device further deletes the correspondence between the allowed NSSAI associated with the other network than the first PLMN and the configured NSSAI of the HPLMN.

Therefore, when the terminal device registers with the other PLMN next time, because the terminal device does not store the allowed NSSAI corresponding to the PLMN either, and the terminal device cannot determine requested NSSAI based on the allowed NSSAI, the terminal device does not add the requested NSSAI to a registration request. Therefore, the network side provides the terminal device with a piece of configured NSSAI of the PLMN based on the current subscription information of the terminal device. This way, it is further ensured that the configured NSSAI of the PLMN can be updated in time.

Optionally, in another implementation, the AMF may not send the second indication information in step 1003. After receiving the first configured NSSAI, the terminal device may delete, without an indication of the AMF, the second configured NSSAI associated with the other network than the first PLMN; and replace the stored third configured NSSAI associated with the first PLMN with the first configured NSSAI. Optionally, the terminal device may further delete the allowed NSSAI associated with the other network. Optionally, the terminal device further deletes the correspondence between the second configured NSSAI and the configured NSSAI of the HPLMN. Optionally, the terminal device further deletes the correspondence between the allowed NSSAI associated with the other network than the first PLMN and the configured NSSAI of the HPLMN.

Optionally, after receiving the first configured NSSAI, the terminal device performs step 1005.

1005. The terminal device sends an acknowledgement (ACK) message to the AMF.

Alternatively, the terminal device may send the ACK to the AMF after receiving the first configured NSSAI and completing an operation of step 1004.

For example, if the first configured NSSAI is sent in step 1003 using the UE configuration update command, the terminal device may send the ACK to the AMF using a UE configuration update complete message. If the first configured NSSAI is sent in step 1003 using the registration accept message, the UE may send the ACK to the AMF using a registration complete message.

Optionally, after receiving the ACK, the AMF performs step 1006.

1006. After receiving the ACK, the AMF notifies the UDM of an update result of configured NSSAI.

For example, the AMF may notify the UDM of the update result of the configured NSSAI by invoking a UE configuration update notification (Namf_Communication_UEConfigurationUpdateNotify) service of the AMF. Optionally, step 1001 may be such that the UDM subscribes to the service with the AMF. After receiving the notification, the UDM determines that the update of the configured NSSAI does not need to be initiated. For example, the UDM does not update the configured NSSAI before the subscribed S-NSSAIs of the terminal device are updated again.

For example, the AMF may notify the UDM of the update result of the configured NSSAI by invoking an event notification (Namf_EventExposure_Notify) service of the AMF. Optionally, the UDM subscribes to the service with the AMF before or after step 1001. After receiving the notification, the UDM determines that the update of the configured NSSAI does not need to be initiated. For example, the UDM does not update the configured NSSAI before the subscribed S-NSSAIs of the terminal device are updated again.

As described above, the example in FIG. 10 is applicable to a configured NSSAI update triggered by terminal device subscription modification (which is modification of the subscribed S-NSSAIs in the subscription data).

In a possible design, the foregoing method is further applicable to a configured NSSAI update triggered by another condition. For example, the other condition includes at least one of the following:

1. There is configuration modification of a serving PLMN, including local policy modification or modification caused by a slice deployment change;

2. The terminal device does not add requested NSSAI when sending a registration request;

3. Specific S-NSSAI in NSSAI requested by the terminal device is invalid in a current PLMN of the terminal device; or 4. NSSAI requested by the terminal device is not in a range of the subscribed S-NSSAIs of the terminal device.

In another possible design, the AMF instructs, only when the configured NSSAI update is triggered by terminal device subscription modification, the terminal device to delete the second configured NSSAI associated with the other network than the first PLMN. Alternatively, the AMF instructs the terminal device to delete the second configured NSSAI and the allowed NSSAI that are associated with the network other than the first PLMN.

The method of FIG. 10 is applicable to a scenario in which the terminal device is powered on after being powered off, and is also applicable to a roaming scenario. Alternatively, optionally, for the scenario in which the terminal device is powered on after being powered off, any one of the methods in FIG. 2 to FIG. 7 may be used. For the roaming scenario, the method in FIG. 10 may be used.

With reference to the foregoing description about FIG. 10, this application provides a communication method. As shown in FIG. 11, the method includes the following steps.

1101. An access and mobility management function network element in a first network obtains first configured network slice selection assistance information, associated with the first network, of a terminal device.

1102. The access and mobility management function network element sends the first configured network slice selection assistance information and indication information to the terminal device, where the indication information is used to instruct the terminal device to delete second configured network slice selection assistance information associated with a network other than the first network.

For the indication information, refer to description about the second indication information in FIG. 10. For step 1102, refer to description about step 1003 in FIG. 10. Details are not described herein again. For example, step 1102 includes: sending, by the access and mobility management function network element, a user equipment configuration update command to the terminal device, where the user equipment configuration update command includes the first configured network slice selection assistance information and the indication information. Alternatively, step 1102 includes sending, by the access and mobility management function network element, a registration accept message to the terminal device, where the registration accept message includes the first configured network slice selection assistance information and the indication information.

Therefore, when the terminal device registers with the other network next time, because the terminal device does not store configured network slice selection assistance information corresponding to the network, the terminal device does not add requested network slice selection assistance information to a registration request. As such, a network side provides the terminal device with a piece of configured network slice selection assistance information of the network based on current subscription information of the terminal device. This way, the configured network slice selection assistance information of the network can be updated in time, thereby improving user experience of the terminal device and saving network resources.

Optionally, the indication information is further used to instruct the terminal device to delete allowed network slice selection assistance information associated with the other network. Therefore, when the terminal device registers with the other network next time, because the terminal device does not store the allowed network slice selection assistance information corresponding to the network either, and the terminal device cannot determine the requested network slice selection assistance information based on the allowed network slice selection assistance information, the terminal device does not add the requested network slice selection assistance information to the registration request. Therefore, the network side provides the terminal device with a piece of configured network slice selection assistance information of the network based on the current subscription information of the terminal device. This way, it is further ensured that the configured network slice selection assistance information of the network can be updated in time.

Optionally, that an access and mobility management function network element in a first network obtains first configured network slice selection assistance information, associated with the first network, of a terminal device includes: receiving, by the access and mobility management function network element from a data management network element, updated subscribed S-NSSAIs, associated with the first network, of the terminal device; and obtaining, by the access and mobility management function network element, the first configured network slice selection assistance information based on the updated subscribed S-NSSAIs. The access and mobility management function network element determines that the first configured network slice selection assistance information is obtained based on the updated subscribed S-NSSAIs, and therefore the access and mobility management function network element sends the indication information to the terminal device. For example, refer to description about steps 1001 and 1002 in FIG. 10.

With reference to the foregoing description about FIG. 10, this application provides a communication method. As shown in FIG. 12, the method includes the following steps.

1201. A terminal device receives, from an access and mobility management function network element in a first network, first configured network slice selection assistance information, corresponding to the first network, of the terminal device.

For step 1201, refer to description about step 1003 in FIG. 10. Details are not described herein again.

1202. The terminal device deletes second configured network slice selection assistance information associated with other network than the first network, and replaces stored third configured network slice selection assistance information associated with the first network with the first configured network slice selection assistance information.

For step 1202, refer to description about step 1004 in FIG. 10. Details are not described herein again.

Because the terminal device deletes the second configured network slice selection assistance information associated with the other network than the first network, when the terminal device registers with the other network next time, because the terminal device does not store configured network slice selection assistance information corresponding to the network, the terminal device does not add requested network slice selection assistance information to a registration request. Therefore, a network side provides the terminal device with a piece of configured network slice selection assistance information of the network based on current subscription information of the terminal device. This way, the configured network slice selection assistance information of the network can be updated in time, thereby improving user experience of the terminal device and saving network resources.

Optionally, the method further includes: receiving, by the terminal device, indication information from the access and mobility management function network element, where the indication information is used to instruct the terminal device to delete the second configured network slice selection assistance information. For example, refer to description about step 1003 in FIG. 10.

Optionally, the method further includes deleting, by the terminal device, allowed network slice selection assistance information associated with the other network. For example, refer to description about step 1004 in FIG. 10. When the terminal device registers with the other network next time, because the terminal device does not store the allowed network slice selection assistance information corresponding to the network either, and the terminal device cannot determine the requested network slice selection assistance information based on the allowed network slice selection assistance information, the terminal device does not add the requested network slice selection assistance information to the registration request. Therefore, the network side provides the terminal device with a piece of configured network slice selection assistance information of the network based on the current subscription information of the terminal device. This way, it is further ensured that the configured network slice selection assistance information of the network can be updated in time. Further, optionally, the method includes receiving, by the terminal device, the indication information from the access and mobility management function network element, where the indication information is used to instruct the terminal device to delete the second configured network slice selection assistance information and the allowed network slice selection assistance information.

FIG. 13 is a schematic flowchart of another communication method according to an embodiment of this application.

The method relates to at least interaction between a terminal device, an AMF, and a UDM. For example, the terminal device, the AMF, and the UDM may be respectively the terminal device 110, the access and mobility management function network element 120, and the unified data management network element 130 in FIG. 1. Details are not described herein again. The terminal device and the AMF are located in a first PLMN. In other words, the first PLMN is a PLMN that currently serves the terminal device. The first PLMN may be an HPLMN or a VPLMN. The UDM is located in the HPLMN of the terminal device.

As shown in FIG. 13, the method includes the following steps.

1301. The UDM sends updated subscribed network slice selection assistance information (updated Subscribed S-NSSAIs) of the terminal device to the AMF in the first PLMN. For example, the updated subscribed S-NSSAIs of the terminal device are used to identify one or more network slices accessible by the terminal device in the first PLMN after subscribed S-NSSAIs are updated.

For example, after subscribed S-NSSAIs in subscription data of the terminal device are updated, the UDM may notify the AMF in the first PLMN of the updated subscribed S-NSSAIs by invoking a subscriber data management (SDM) notification (Nudm_SDM_Notification) service of the UDM. In addition, the UDM may send the subscribed S-NSSAIs and first indication information to the AMF in the first PLMN by invoking a Nudm_SDM_Get service. The first indication information is used to indicate that the subscribed S-NSSAIs are updated. That is, the subscribed S-NSSAIs are updated subscribed S-NSSAIs.

Optionally, after receiving the updated subscribed S-NSSAIs (or the updated subscribed S-NSSAIs and the first indication information), the AMF may return an acknowledgement message to the UDM.

1302. The AMF sends second indication information to the terminal device. The second indication information is used to instruct the terminal device to delete second configured NSSAI associated with another different from the first PLMN.

In other words, the AMF sends the second indication information to the UE in step 1302 only when the AMF is notified that the subscribed S-NSSAIs of the first PLMN are updated.

For example, the AMF may send a UE configuration update command to the terminal device, where the user equipment configuration update command includes the second indication information. Alternatively, the AMF may send a registration accept message to the terminal device, where the registration accept message includes the second indication information. This is not limited herein in this application. The foregoing message may be sent by the AMF to an (R)AN device, and then the (R)AN device forwards the message to the terminal device.

The "other network than the first PLMN" herein may be a network other than the first PLMN, such as another PLMN different from the first PLMN in a network range that may be accessed by the terminal.

Optionally, the second indication information is further used to instruct the terminal device to delete allowed NSSAI associated with the other network than the first PLMN. Allowed NSSAI associated with a network is used to identify a network slice, to which the terminal device is allowed to access, in the first PLMN.

Optionally, the second indication information is further used to instruct the terminal device to delete a correspondence between the second configured NSSAI associated with the other network and configured NSSAI of the HPLMN. Optionally, the second indication information is further used to instruct the terminal device to delete a correspondence between the allowed NSSAI associated with the other network and the configured NSSAI of the HPLMN.

Optionally, before sending the second indication information to the terminal device, the AMF determines that third configured NSSAI, associated with the first PLMN, of the terminal does not need to be updated.

1303. After receiving the second indication information, the terminal device deletes second configured NSSAI associated with other network than the first PLMN.

Optionally, when the second indication information is further used to instruct the terminal device to delete the correspondence between the second configured NSSAI associated with the other network and the configured NSSAI of the HPLMN, after receiving the indication information sent in step 1302, the terminal device further deletes the correspondence between the second configured NSSAI and the configured NSSAI of the HPLMN.

Therefore, according to the foregoing solution, during subscription data modification of the terminal device, the AMF instructs the terminal device to delete previously stored configured NSSAI of another PLMN. In this way, when the terminal device registers with the other PLMN next time, because the terminal device does not store the configured NSSAI corresponding to the PLMN, the terminal device does not add requested NSSAI to a registration request. Therefore, a network side provides the terminal device with a piece of configured NSSAI of the PLMN based on current subscription information of the terminal device. This way, the configured NSSAI of the PLMN can be updated in time, thereby improving user experience of the terminal device and saving network resources.

Optionally, when the second indication information is further used to instruct the terminal device to delete the allowed NSSAI associated with the other network, after receiving the indication information sent in step 1302, the terminal device further deletes the allowed NSSAI associated with the other network. Optionally, the terminal device further deletes the correspondence between the allowed NSSAI associated with the other network than the first PLMN and the configured NSSAI of the HPLMN.

When the terminal device registers with the other PLMN next time, because the terminal device does not store the allowed NSSAI corresponding to the PLMN either, and the terminal device cannot determine requested NSSAI based on the allowed NSSAI, the terminal device does not add the requested NSSAI to a registration request. Therefore, the network side provides the terminal device with a piece of configured NSSAI of the PLMN based on the current subscription information of the terminal device. As such, it is further ensured that the configured NSSAI of the PLMN can be updated in time.

Optionally, after receiving the second indication information, the terminal device performs step 1304.

1304. The terminal device sends an acknowledgement message (e.g., an ACK) to the AMF.

Alternatively, the terminal device may send the ACK to the AMF after receiving first configured NSSAI and completing an operation of step 1303.

For example, if the second indication information is sent in step 1304 using the UE configuration update command, the terminal device may send the ACK to the AMF using a UE configuration update complete message. If the second indication information is sent in step 1302 using the registration accept message, the UE may send the ACK to the AMF using a registration complete message.

Optionally, after receiving the ACK, the AMF performs step 1305.

1305. After receiving the ACK, the AMF notifies the UDM of an update result of configured NSSAI.

For example, the AMF may notify the UDM of the update result of the configured NSSAI by invoking a UE configuration update notification (Namf_Communication_UEConfigurationUpdateNotify) service of the AMF. Optionally, step 1301 may be such that that the UDM subscribes to the service with the AMF. After receiving the notification, the UDM determines that the update of the configured NSSAI does not need to be initiated. For example, the UDM does not update the configured NSSAI before the subscribed S-NSSAIs of the terminal device are updated again.

For example, the AMF may notify the UDM of the update result of the configured NSSAI by invoking an event notification (Namf_EventExposure_Notify) service of the AMF. Optionally, the UDM subscribes to the service with the AMF before or after step 1301. After receiving the notification, the UDM determines that the update of the configured NSSAI does not need to be initiated. For example, the UDM does not update the configured NSSAI before the subscribed S-NSSAIs of the terminal device are updated again.

As described above, the example in FIG. 13 is applicable to a configured NSSAI update triggered by terminal device subscription modification (which is modification of the subscribed S-NSSAIs in the subscription data), and the example in FIG. 13 supports a scenario in which configured NSSAI managed by the first PLMN does not need to be updated.

In a possible design, the foregoing method is further applicable to a configured NSSAI update triggered by another condition. For example, the other condition includes at least one of the following:

1. There is configuration modification of a serving PLMN, including local policy modification or modification caused by a slice deployment change;
2. The terminal device does not add requested NSSAI when sending a registration request;
3. Specific S-NSSAI in NSSAI requested by the terminal device is invalid in a current PLMN of the terminal device; or
4. NSSAI requested by the terminal device is not in a range of the subscribed S-NSSAIs of the terminal device.

In another possible design, the AMF instructs, only when the configured NSSAI update is triggered by terminal device subscription modification, the terminal device to delete the second configured NSSAI associated with the other network than the first PLMN. Alternatively, the AMF instructs the terminal device to delete the second configured NSSAI and the allowed NSSAI that are associated with the other network than the first PLMN.

The method in FIG. 13 is applicable to a scenario in which the terminal device deregisters and then re-registers (for example, is powered on after being powered off), and is also applicable to a roaming scenario. Alternatively, optionally, for the scenario in which the terminal device deregisters and then re-registers (for example, is powered on after being powered off), any one of the methods in FIG. 2 to FIG. 7 may be used. For the roaming scenario, the method in FIG. 13 may be used.

With reference to description about FIG. 13, in the method shown in FIG. 11, in step 1102, the access and mobility management function network element may send only the indication information to the terminal device, where the indication information is used to instruct the terminal device to delete the second configured network slice selection assistance information associated with the other network than the first network. In the method shown in FIG. 12, in step 1202, the terminal device may delete the second configured network slice selection assistance information associated with the other network than the first network. Because the terminal device has not received the first configured network slice selection assistance information, stored third configured network slice selection assistance information associated with the first network may not need to be replaced with the first configured network slice selection assistance information.

In the foregoing embodiments provided in this application, the solutions of the communication methods provided in the embodiments of this application are separately described from the perspectives of network elements and interaction between the network elements. It can be understood that, to implement the foregoing functions, the network elements include a corresponding hardware structure and/or software module for performing the functions. A person skilled in the art should be aware that, in combination with the examples described in the embodiments disclosed in this specification, units, and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that such implementation goes beyond the scope of this application.

Figure 8A:
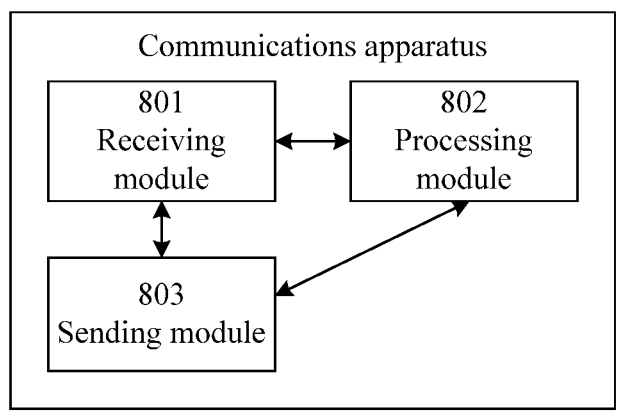
FIG. 8A to FIG. 8H each are a schematic structural diagram of a communications apparatus according to an embodiment of this application.

For example, when the foregoing network elements implement corresponding functions using software modules, a communications apparatus is located in a first public land mobile network, and as shown in FIG. 8A, may include a receiving module 801, a processing module 802, and a sending module 803. The apparatus may be an access and mobility management function network element or a chip.

The apparatus may be configured to perform operations of the access and mobility management function network element in FIG. 2. For example, the receiving module 801 is configured to receive a registration request message from a terminal device. The processing module 802 is configured such that when determining that a first condition is met, the processing module 802 sends configured network slice selection assistance information of the first public land mobile network to the terminal device using the sending module 803. The first condition includes either of the following: the registration request message is an initial registration request message, or the registration request message is sent after the terminal device moves from a second public land mobile network to the first public land mobile network.

Therefore, for a scenario in which subscribed S-NSSAI of a terminal device changes when the terminal device is in a deregistered state (RM-DEREGISTERED), or for a scenario in which subscribed S-NSSAI included in subscription information of a terminal device changes when the terminal device moves from a second PLMN to a first PLMN and camps on the second PLMN, the apparatus may be used to ensure that configured NSSAI of the first PLMN used by the terminal device is updated in time, thereby improving user experience of the terminal device and saving network resources.

Optionally, the first condition further includes: the access and mobility management function network element obtains subscription information of the terminal device from a unified data management network element. Therefore, the AMF may be prevented from repeatedly sending the configured network slice selection assistance information of the first PLMN to the terminal device when the terminal device repeatedly registers with the AMF in a short time, thereby further avoiding a waste of network signaling and saving network resources.

Figure 8B:
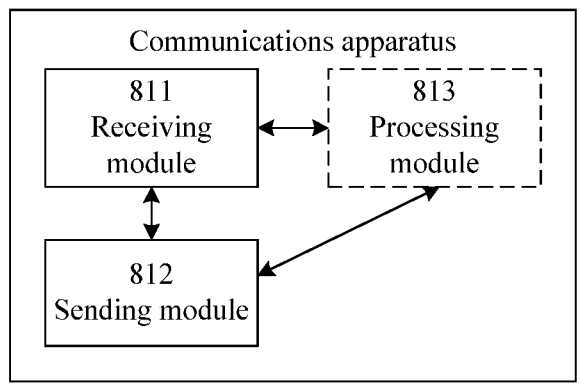

As shown in FIG. 8B, another communications apparatus may include a receiving module 811 and a sending module 812. Optionally, the communications apparatus further includes a processing module 813. The apparatus may be a unified data management network element or a chip.

The apparatus may be configured to perform operations of the UDM in FIG. 3, FIG. 4, or FIG. 5. For example, the receiving module 811 is configured to receive, from a first access and mobility management function network element in a first public land mobile network, a request for obtaining subscription information of a terminal device, where the first access and mobility management function network element is an access and mobility management function network element that serves the terminal device. The sending module 812 is configured to send the subscription information of the terminal device to the first access and mobility management function network element, where the subscription information of the terminal device includes at least subscribed network slice selection assistance information of the terminal device. The sending module 812 is further configured to instruct the first access and mobility management function network element to update first configured network slice selection assistance information, where the first configured network slice selection assistance information is configured network slice selection assistance information of the with which the terminal device requests to register.

Therefore, for a scenario in which subscribed S-NSSAI of a terminal device changes when the terminal device is in a deregistered state (RM-DEREGISTERED), or for a scenario in which subscribed S-NSSAI included in subscription information of a terminal device changes when the terminal device moves from a second PLMN to a first PLMN and camps on the second PLMN, the apparatus may be used to ensure that configured NSSAI of the first PLMN used by the terminal device is updated in time, thereby improving user experience of the terminal device and saving network resources.

For example, the sending module 812 is configured to send first indication information to the first access and mobility management function network element, where the first indication information is used to instruct the first access and mobility management function network element to update the first configured network slice selection assistance information. Alternatively, the sending module 812 is configured to send a subscription modification notification message of the terminal device to the first access and mobility management function network element, where the subscription modification notification message of the terminal device includes the subscribed network slice selection assistance information of the terminal device.

Optionally, the sending module 812 is further configured to send a subscription request to the first access and mobility management function network element, where the subscription request is used to request the first access and mobility management function network element to send a notification message to the unified data management network element after the update of the first configured network slice selection assistance information is completed. The receiving module 811 is further configured to receive the notification message from the first access and mobility management function network element.

Optionally, the processing module 813 is configured such that after the sending module 812 instructs the first access and mobility management function network element to update the first configured network slice selection assistance information, the processing module 813 determines that the update of the first configured network slice selection assistance information does not need to be initiated. Alternatively, the processing module 813 is configured such that after the receiving module 811 receives the notification message from the first access and mobility management function network element, the processing module 813 determines that the update of the first configured network slice selection assistance information does not need to be initiated.

Optionally, the processing module 813 is configured such that before the sending module 812 instructs the first access and mobility management function network element to update the first configured network slice selection assistance information, the processing module 813 determines that configured network slice selection assistance information of one or more public land mobile networks of the terminal needs to be updated, where the one or more public land mobile networks include the first public land mobile network. For example, the processing module 813 is configured such that when determining that the subscription information of the terminal device changes, the processing module 813 determines that configured network slice selection assistance information of one or more public land mobile networks of the terminal needs to be updated.

Figure 8C:
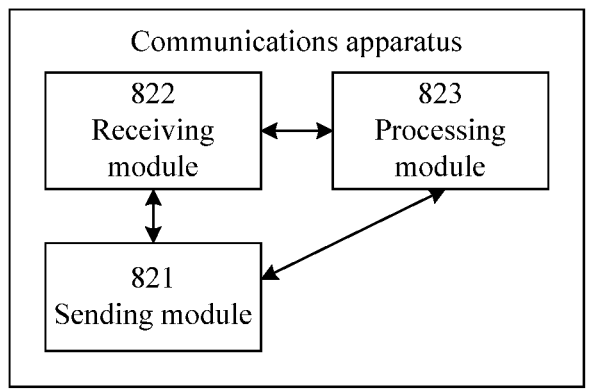

As shown in FIG. 8C, another communications apparatus may include a sending module 821, a receiving module 822, and a processing module 823. The apparatus may be an access and mobility management function network element or a chip.

The apparatus may be configured to perform operations of the AMF in FIG. 3, FIG. 4, or FIG. 5. For example, the sending module 821 is configured to send, to a unified data management network element, a request for obtaining subscription information of a terminal device, where a first access and mobility management function network element is an access and mobility management function network element that serves the terminal device. The receiving module 822 is configured to receive the subscription information of the terminal device from the unified data management network element, where the subscription information of the terminal device includes at least subscribed network slice selection assistance information of the terminal device. The processing module 823 is configured to update first configured network slice selection assistance information according to an indication of the unified data management network element, where the first configured network slice selection assistance information is configured network slice selection assistance information of the with which the terminal device requests to register.

Therefore, for a scenario in which subscribed S-NSSAI of a terminal device changes when the terminal device is in a deregistered state (RM-DEREGISTERED), or for a scenario in which subscribed S-NSSAI included in subscription information of a terminal device changes when the terminal device moves from a second PLMN to a first PLMN and camps on the second PLMN, the apparatus may be used to ensure that configured NSSAI of the first PLMN used by the terminal device is updated in time, thereby improving user experience of the terminal device and saving network resources.

Optionally, the processing module 823 is configured such that when the receiving module receives first indication information from the unified data management network element, the processing module 823 updates the first configured network slice selection assistance information based on the subscribed network slice selection assistance information. Alternatively, the processing module 823 is configured such that when the receiving module 822 receives a subscription modification notification message of the terminal device from the unified data management network element, the processing module 823 updates the first configured network slice selection assistance information based on the subscribed network slice selection assistance information of the terminal device included in the subscription modification notification message of the terminal device.

Optionally, the receiving module 822 is further configured to receive a subscription request from the unified data management network element, where the subscription request is used to request the first access and mobility management function network element to send a notification message to the unified data management network element after the update of the first configured network slice selection assistance information is completed. After the receiving module 822 receives a configuration update complete message from the terminal device, the sending module 821 is further configured to send the notification message to the unified data management network element, where the configuration update complete message is used to indicate that the terminal device has completed the update of the first configured network slice selection assistance information.

Figure 8D:
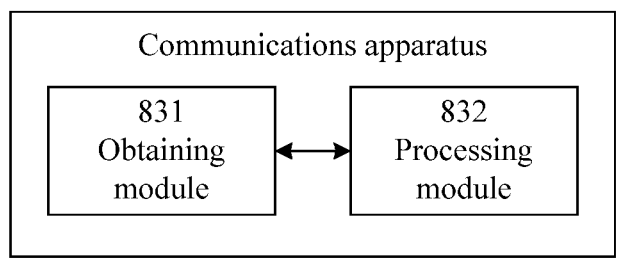

As shown in FIG. 8D, another communications apparatus may include an obtaining module 831 and a processing module 832. The apparatus may be an access and mobility management function network element or a chip.

The apparatus may be configured to perform operations of the AMF in FIG. 6. For example, the obtaining module 831 is configured to obtain subscribed network slice selection assistance information of the terminal device, and obtain first configured network slice selection assistance information of the terminal device, where the first configured network slice selection assistance information is configured network slice selection assistance information of a first public land mobile network with which the terminal device requests to register. The processing module 832 is configured to: determine, based on the subscribed network slice selection assistance information, whether the first configured network slice selection assistance information needs to be updated; and if it is determined that the first configured network slice selection assistance information needs to be updated, determine second configured network slice selection assistance information based on the subscribed network slice selection assistance information, and send the second configured network slice selection assistance information to the terminal device using a sending module.

Therefore, for a scenario in which subscribed S-NSSAI of a terminal device changes when the terminal device is in a deregistered state (RM-DEREGISTERED), or for a scenario in which subscribed S-NSSAI included in subscription information of a terminal device changes when the terminal device moves from a second PLMN to a first PLMN and camps on the second PLMN, the apparatus may be used to ensure that configured NSSAI of the first PLMN used by the terminal device is updated in time, thereby improving user experience of the terminal device and saving network resources.

Optionally, the obtaining module 831 is configured to receive a registration request message from the terminal device, where the registration request message includes the first configured network slice selection assistance information. The registration request message is an initial registration request message, or the registration request message is sent after the terminal device moves from a second public land mobile network to the first public land mobile network. Alternatively, the obtaining module 831 is configured to obtain a context of the terminal device, where the context of the terminal device includes the first configured network slice selection assistance information.

Optionally, the processing module 832 is configured to determine whether the first configured network slice selection assistance information is the same as the subscribed network slice selection assistance information. If the first configured network slice selection assistance information is different from the subscribed network slice selection assistance information, the processing module 832 is configured to determine that the first configured network slice selection assistance information needs to be updated to the second configured network slice selection assistance information, where single network slice selection assistance information included in the second configured network slice selection assistance information is the same as the subscribed network slice selection assistance information.

Optionally, the first configured network slice selection assistance information is configured network slice selection assistance information of a visited public land network of the terminal device. Additionally, the processing module 832 is configured to determine, based on the first configured network slice selection assistance information, the subscribed network slice selection assistance information, and a mapping relationship between the first configured network slice selection assistance information and configured network slice selection assistance information of a home public land network of the terminal device, whether the first configured network slice selection assistance information needs to be updated.

Optionally, the processing module 832 is further configured to store the second configured network slice selection assistance information in the context of the terminal device.

Figure 8E:
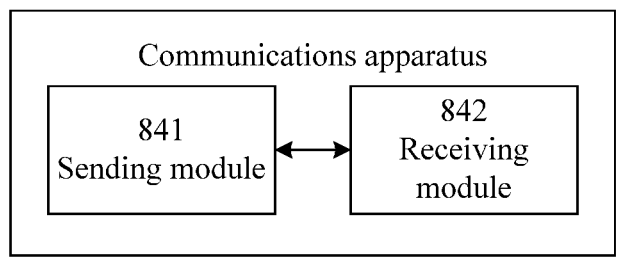

As shown in FIG. 8E, another communications apparatus may include a sending module 841 and a receiving module 842. The apparatus may be a terminal device or a chip.

The apparatus may be configured to perform operations of the UE in FIG. 6. For example, the sending module 841 is configured to send a registration request message to an access and mobility management function network element, where the registration request message includes first configured network slice selection assistance information of the terminal device, and the first configured network slice selection assistance information is configured network slice selection assistance information of a first public land mobile network with which the terminal device requests to register. The receiving module 842 is configured to obtain second configured network slice selection assistance information of the first public land mobile network.

Therefore, for a scenario in which subscribed S-NSSAI of a terminal device changes when the terminal device is in a deregistered state (RM-DEREGISTERED), or for a scenario in which subscribed S-NSSAI included in subscription information of a terminal device changes when the terminal device moves from a second PLMN to a first PLMN and camps on the second PLMN, the apparatus may be used to ensure that configured NSSAI of the first PLMN used by the terminal device is updated in time, thereby improving user experience of the terminal device and saving network resources.

Optionally, the registration request message is an initial registration request message, or the registration request message is sent after the terminal device moves from a second public land mobile network to the first public land mobile network.

Figure 8F:
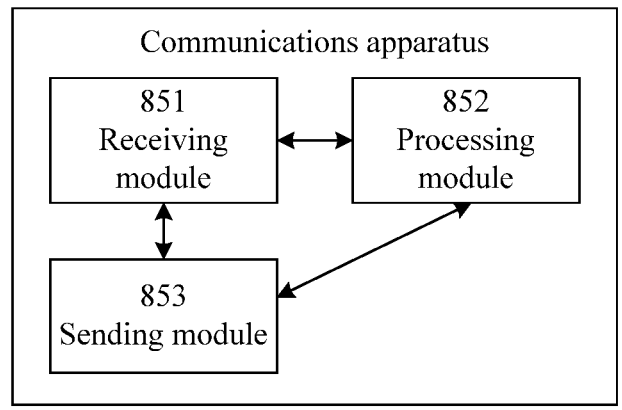

As shown in FIG. 8F, another communications apparatus may include a receiving module 851, a processing module 852, and a sending module 853. The apparatus may be a terminal device or a chip.

The apparatus may be configured to perform operations of the UE in FIG. 7. For example, the receiving module 851 is configured to receive an updated user equipment route selection policy. The processing module 852 is configured to determine that no transmission of update indication information to an access and mobility management function network element is recorded. The sending module 853 is configured to send the update indication information to the access and mobility management function network element, where the update indication information is used to instruct the access and mobility management function network element to send updated configured network slice selection assistance information to the terminal device, and the access and mobility management function network element is located in a visited public land mobile network. The processing module 852 is configured to record that the update indication information has been sent to the visited PLMN.

Therefore, for a scenario in which subscribed S-NSSAI of a terminal device changes when the terminal device is in a deregistered state (RM-DEREGISTERED), or for a scenario in which subscribed S-NSSAI included in subscription information of a terminal device changes when the terminal device moves from a second PLMN to a first PLMN and camps on the second PLMN, the apparatus may be used to ensure that configured NSSAI of the first PLMN used by the terminal device is updated in time, thereby improving user experience of the terminal device and saving network resources.

Figure 8G:
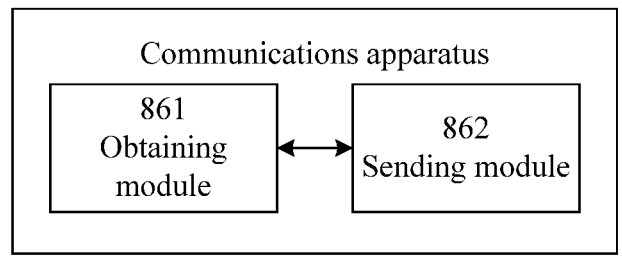

As shown in FIG. 8G, another communications apparatus may include an obtaining module 861 and a sending module 862. The apparatus may be an access and mobility management function network element or a chip.

The apparatus may be configured to perform operations of the AMF in FIG. 10 or FIG. 11. For example, the obtaining module 861 is configured to obtain first configured network slice selection assistance information, associated with a first network, of a terminal device. The sending module 862 is configured to send the first configured network slice selection assistance information and indication information to the terminal device, where the indication information is used to instruct the terminal device to delete second configured network slice selection assistance information associated with other network than the first network.

Therefore, the communications apparatus may be used to ensure that configured NSSAI of a first PLMN used by the terminal device is updated in time, thereby improving user experience of the terminal device and saving network resources.

Optionally, the indication information is further used to instruct the terminal device to delete allowed network slice selection assistance information associated with the other network.

Optionally, to obtain the first configured network slice selection assistance information, associated with the first network, of the terminal device, the obtaining module 861 is configured to: receive, from a data management network element, updated subscribed S-NSSAIs, associated with the first network, of the terminal device; and obtain the first configured network slice selection assistance information based on the updated subscribed S-NSSAIs. The communications apparatus determines that the first configured network slice selection assistance information is obtained based on the updated subscribed S-NSSAIs, such that the sending module 862 sends the indication information to the terminal device.

Optionally, to send the first configured network slice selection assistance information and the indication information, the sending module 862 is configured to: send a user equipment configuration update command to the terminal device, where the user equipment configuration update command includes the first configured network slice selection assistance information and the indication information; or send a registration accept message to the terminal device, where the registration accept message includes the first configured network slice selection assistance information and the indication information.

Figure 8H:
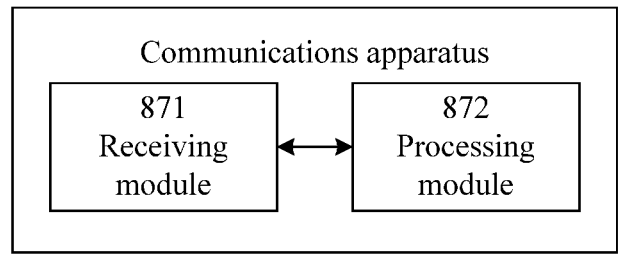

As shown in FIG. 8H, another communications apparatus may include a receiving module 871 and a processing module 872. The apparatus may be a terminal device or a chip.

The apparatus may be configured to perform operations of the terminal device in FIG. 10 or FIG. 12. For example, the receiving module 871 is configured to receive, from an access and mobility management function network element in a first network, first configured network slice selection assistance information, corresponding to the first network, of the terminal device. The processing module 872 is configured to: delete second configured network slice selection assistance information associated with another network than the first network; and replace stored third configured network slice selection assistance information associated with the first network with the first configured network slice selection assistance information.

Therefore, the communications apparatus may be used to ensure that configured NSSAI of a first PLMN used by the terminal device is updated in time, thereby improving user experience of the terminal device and saving network resources.

Optionally, the receiving module 871 is further configured to receive indication information from the access and mobility management function network element, where the indication information is used to instruct the terminal device to delete the second configured network slice selection assistance information.

Optionally, the processing module 872 is further configured to delete allowed network slice selection assistance information associated with the other network. Further, optionally, the receiving module 871 is configured to receive the indication information from the access and mobility management function network element, where the indication information is used to instruct the terminal device to delete the second configured network slice selection assistance information and the allowed network slice selection assistance information.

Figure 9:
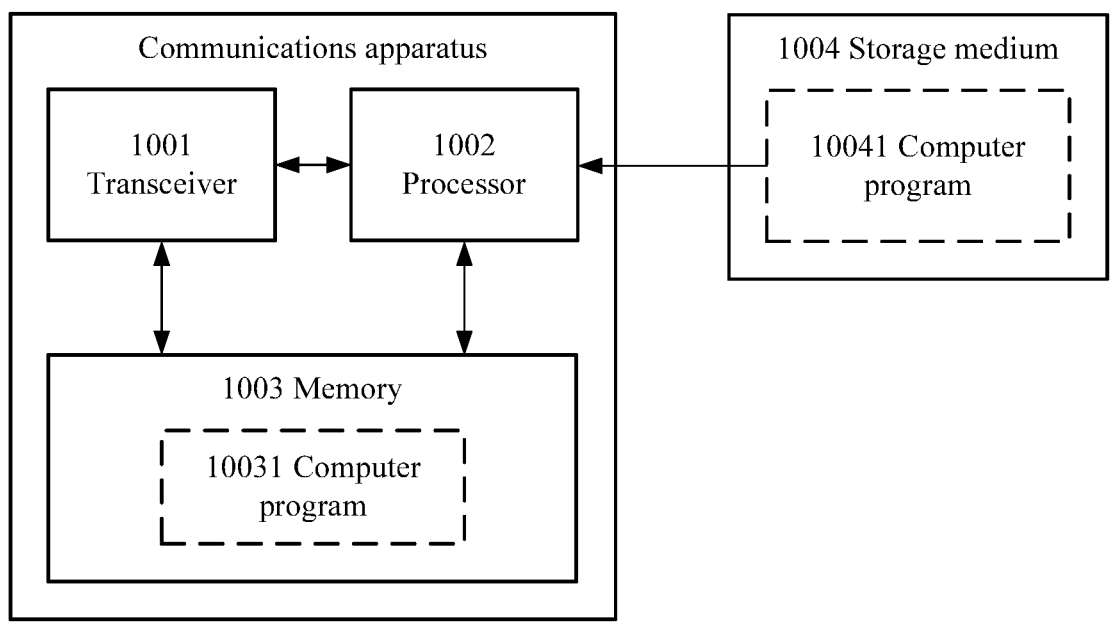
FIG. 9 is a schematic structural diagram of a communications apparatus according to an embodiment of this application.

FIG. 9 is another possible schematic structural diagram of the communications apparatus in the foregoing embodiments. As shown in FIG. 10, the apparatus includes a transceiver 1001 and a processor 1002.

For example, the processor 1002 may be a general purpose microprocessor, a data processing circuit, an application-specific integrated circuit (ASIC) or a field-programmable gate array (FPGA) circuit. The apparatus may further include a memory 1003. The memory is configured to be coupled with the processor 1002, and can store a necessary computer program 10031 of the apparatus.

In addition, the communication method in the foregoing embodiments provides a computer readable storage medium 1004 (for example, a hard disk). The computer readable storage medium stores a computer program 10041 of the apparatus. The computer program 10041 may be loaded onto the processor 1002.

When the computer program 10031 or 10041 runs on a computer (for example, the processor 1002), the computer may be enabled to perform the foregoing methods.

For example, in an embodiment, the processor 1002 is configured to perform operations or functions of the foregoing access and mobility management function network element (AMF). The transceiver 1001 is configured to implement communication between the apparatus and a UDM, a RAN device, or another AMF.

In another embodiment, the processor 1002 is configured to perform operations or functions of the foregoing unified data management network element (UDM). The transceiver 1001 is configured to implement communication between the apparatus and an AMF.

In still another embodiment, the processor 1002 is configured to perform operations or functions of the foregoing terminal device (e.g., UE). The transceiver 1001 is configured to implement communication between the apparatus and an AMF and between the apparatus and a RAN device.

The processor for performing functions of the communications apparatus in this application may be a central processing unit (CPU), a general purpose processor, a digital signal processor (DSP), an application specific integrated circuit (ASIC), a field-programmable gate array (FPGA) or another programmable logic device, a transistor logic device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

Method or algorithm steps described in combination with the content disclosed in this application may be implemented by hardware, or may be implemented by a processor by executing a software instruction. The software instruction may include a corresponding software module. The software module may be located in a random-access memory (RAM) memory, a flash memory, a read-only memory (ROM) memory, an erasable programmable ROM (EPROM) memory, an electrically erasable programmable ROM (EEPROM) memory, a register, a hard disk, a removable hard disk, a CD-ROM, or a storage medium of any other form known in the art. For example, a storage medium is coupled to a processor, such that the processor can read information from the storage medium or write information into the storage medium. Certainly, the storage medium may be a component of the processor. The processor and the storage medium may be located in the ASIC. In addition, the ASIC may be located in a communications apparatus. Certainly, the processor and the storage medium may exist in the communications apparatus as discrete components. The memory 1003 may include a volatile memory, such as RAM.

The memory 1003 may include a non-volatile memory, such as a flash memory, a hard disk drive (HDD), or a solid-state drive (SSD). The memory 1003 may further include a combination of memories of the foregoing types.

Therefore, still another aspect of this application provides a computer readable storage medium. The computer readable storage medium stores an instruction. When the instruction runs on a computer, the computer is enabled to perform the foregoing methods.

Still another aspect of this application provides a computer program product including an instruction. When the computer program product runs on a computer, the computer is enabled to perform the foregoing methods.

Still another aspect of this application provides a communications system, including an access and mobility management function network element configured to perform the method according to claim 1 or 2.

Still another aspect of this application provides a communications system, including: a unified data management network element configured to perform the method according to any one of claims 3 to 10; and an access and mobility management function network element configured to perform the method according to any one of claims 11 to 14.

Still another aspect of this application provides a communications system, including an access and mobility management function network element configured to perform the method according to any one of claims 15 to 21. Optionally, the system further includes a terminal device configured to perform the method according to claim 22 or 23.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of this application.

It may be understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communication method, comprising:
   receiving, by an access and mobility management function network device in a first Public Land Mobile Network (PLMN), updated subscribed network slice selection assistance information of a terminal device from a data management network device;
   obtaining, by the access and mobility management function network device based on the updated subscribed network slice selection assistance information, first configured network slice selection assistance information of the terminal device, wherein the first configured network slice selection assistance information is associated with the first PLMN; and
   sending, by the access and mobility management function network device, the first configured network slice selection assistance information and indication information to the terminal device, wherein the indication information is for deletion of second configured network slice selection assistance information associated with at least one second PLMN other than the first PLMN at the terminal device.

2. The communication method according to claim 1, further comprising sending, by the data management network device, the updated subscribed network slice selection assistance information to the access and mobility management function network device.

3. The communication method according to claim 1, wherein obtaining the first configured network slice selection assistance information comprises either:
   determining, by the access and mobility management function network device, the first configured network slice selection assistance information based on the updated subscribed network slice selection assistance information; or
   obtaining, by the access and mobility management function network device after receiving the updated subscribed network slice selection assistance information, the first configured network slice selection assistance information from a network slice selection function network device.

4. The communication method according to claim 1, wherein the indication information is further for deletion of allowed network slice selection assistance information associated with the at least one second PLMN at the terminal device.

5. The communication method according to claim 1, wherein sending the indication information to the terminal device comprises sending, by the access and mobility management function network device, the indication information to the terminal device when the first configured network slice selection assistance information is obtained based on the updated subscribed network slice selection assistance information, and wherein the indication information comprises a network slicing subscription change indication.

6. The communication method according to claim 1, wherein sending, by the access and mobility management function network device, the first configured network slice selection assistance information and the indication information to the terminal device comprises sending, by the access and mobility management function network device, a user equipment configuration update command to the terminal device, and wherein the user equipment configuration update command comprises the first configured network slice selection assistance information and the indication information.

7. The communication method according to claim 1, wherein sending, by the access and mobility management function network device, the first configured network slice selection assistance information and the indication information to the terminal device comprises sending, by the access and mobility management function network device, a registration accept message to the terminal device, and wherein the registration accept message comprises the first configured network slice selection assistance information and the indication information.

8. The communication method according to claim 1, further comprising:
receiving, by the terminal device from the access and mobility management function network device, the first configured network slice selection assistance information of the terminal device; and
performing an update by the terminal device such that only the first configured network slice selection assistance information, among all configured network slice selection assistance information, is stored by the terminal device, wherein each configured network slice selection assistance information is associated with a PLMN.

9. The communication method according to claim 1, further comprising:
receiving, by a second access and mobility management function network device in the at least one second PLMN, registration request information from the terminal device, wherein the second configured network slice selection assistance information is not included in the registration request information; and
providing, by the second access and mobility management function network device in response to receiving the registration request information, the terminal device with configured network slice selection assistance information associated with the at least one second PLMN.

10. An access and mobility management function network device in a first Public Land Mobile Network (PLMN), the access and mobility management function network device comprising:
a processor; and
a memory coupled to the processor and configured to store instructions that, when executed by the processor, cause the access and mobility management function network device to:
receive, from a data management network device, updated subscribed network slice selection assistance information of a terminal device;
obtain, based on the updated subscribed network slice selection assistance information, first configured network slice selection assistance information of the terminal device, wherein the first configured network slice selection assistance information is associated with the first PLMN; and
send the first configured network slice selection assistance information and indication information to the terminal device,
wherein the indication information is for deletion of second configured network slice selection assistance information associated with at least one second PLMN other than the first PLMN at the terminal device.

11. The access and mobility management function network device according to claim 10, wherein the instructions further cause the access and mobility management function network device to either:
determine the first configured network slice selection assistance information based on the updated subscribed network slice selection assistance information; or
obtain, after receiving the updated subscribed network slice selection assistance information, the first configured network slice selection assistance information from a network slice selection function network device.

12. The access and mobility management function network device according to claim 10, wherein the indication information is further for deletion of allowed network slice selection assistance information associated with the at least one second PLMN at the terminal device.

13. The access and mobility management function network device according to claim 10, wherein the instructions further cause the access and mobility management function network device to send the indication information to the terminal device when the first configured network slice selection assistance information is obtained based on the updated subscribed network slice selection assistance information, and wherein the indication information comprises a network slicing subscription change indication.

14. The access and mobility management function network device according to claim 10, wherein the instructions further cause the access and mobility management function network device to send a user equipment configuration update command to the terminal device, and wherein the user equipment configuration update command comprises the first configured network slice selection assistance information and the indication information.

15. The access and mobility management function network device according to claim 10, wherein the instructions further cause the access and mobility management function network device to send a registration accept message to the terminal device, and wherein the registration accept message comprises the first configured network slice selection assistance information and the indication information.

16. A communication method, comprising:

receiving, by a terminal device from an access and mobility management function network device in a first Public Land Mobile Network (PLMN), first configured network slice selection assistance information of the terminal device and indication information, wherein the first configured network slice selection assistance information is associated with the first PLMN;

deleting, by the terminal device according to the indication information, second configured network slice selection assistance information associated with at least one second PLMN other than the first PLMN; and replacing, by the terminal device, stored third configured network slice selection assistance information with the first configured network slice selection assistance information, wherein the stored third configured network slice selection assistance information is associated with the first PLMN.

17. The communication method according to claim 16, wherein the indication information comprises a network slicing subscription change indication, and wherein the indication information is for the terminal device to delete the second configured network slice selection assistance information.

18. The communication method according to claim 16, further comprising deleting, by the terminal device, allowed network slice selection assistance information associated with the at least one second PLMN.

19. The communication method according to claim 16, further comprising deleting, by the terminal device according to the indication information, allowed network slice selection assistance information associated with the at least one second PLMN.

20. A communications apparatus, comprising:
a processor; and
a memory coupled to the processor and configured to store instructions that, when executed by the processor, cause the communications apparatus to:

receive, from an access and mobility management function network device in a first Public Land Mobile Network (PLMN), first configured network slice selection assistance information of a terminal device and indication information, wherein the first configured network slice selection assistance information is associated with the first PLMN;

delete, according to the indication information, second configured network slice selection assistance information associated with at least one second PLMN other than the first PLMN; and replace stored third configured network slice selection assistance information associated with the first configured network slice selection assistance information, wherein the third configured network slice selection assistance information is associated with the first PLMN.

21. The communications apparatus according to claim 20, wherein the indication information comprises a network slicing subscription change indication, and wherein the indication information is for the terminal device to delete the second configured network slice selection assistance information.

22. The communications apparatus according to claim 20, wherein the instructions further cause the communications apparatus to delete allowed network slice selection assistance information associated with the at least one second PLMN.

23. The communications apparatus according to claim 20, wherein the indication information is for the terminal device to delete allowed network slice selection assistance information associated with the at least one second PLMN.

* * * * *